(12) United States Patent
Gandrothula et al.

(10) Patent No.: US 12,422,600 B1
(45) Date of Patent: Sep. 23, 2025

(54) LASER BEAM EXTRACTION USING DISTRIBUTED BRAGG REFLECTOR (DBR) MIRROR SYSTEMS WITH A PIEZOELECTRIC LAYER

(71) Applicant: Blue Laser Fusion, Inc., Palo Alto, CA (US)

(72) Inventors: Srinivas Gandrothula, Palo Alto, CA (US); Shuji Nakamura, Goleta, CA (US)

(73) Assignee: Blue Laser Fusion, Inc., Palo Alto, CA (US)

( * ) Notice: Subject to any disclaimer, the term of this patent is extended or adjusted under 35 U.S.C. 154(b) by 0 days.

(21) Appl. No.: 18/799,148

(22) Filed: Aug. 9, 2024

(51) Int. Cl.
| | |
|---|---|
| *G02B 17/00* | (2006.01) |
| *G02B 5/08* | (2006.01) |
| *H02N 2/00* | (2006.01) |
| *H02N 2/04* | (2006.01) |

(52) U.S. Cl.
CPC ......... *G02B 5/0833* (2013.01); *G02B 17/004* (2013.01); *H02N 2/04* (2013.01); *H02N 2/22* (2013.01)

(58) Field of Classification Search
CPC . G02B 6/022; G02B 6/02076; G02B 6/29322
See application file for complete search history.

(56) References Cited

U.S. PATENT DOCUMENTS

| | | | |
|---|---|---|---|
| 5,168,400 A | 12/1992 | Moses | |
| 7,616,376 B2 * | 11/2009 | Arsenault | G02F 1/21 252/582 |
| 8,208,508 B2 | 6/2012 | Deri et al. | |
| 9,171,646 B2 | 10/2015 | Moses et al. | |
| 10,410,752 B2 | 9/2019 | Hora | |
| 10,476,226 B2 | 11/2019 | Bayramian et al. | |

(Continued)

FOREIGN PATENT DOCUMENTS

| | | | |
|---|---|---|---|
| JP | 2002090659 A | * | 3/2002 |
| WO | 2011029031 A1 | | 3/2011 |

(Continued)

OTHER PUBLICATIONS

Peter Russbueldt et al., "Innoslab Amplifiers", IEEE Journal of Selected Topics in Quantum Electronics, Jan./Feb. 2015, vol. 21, No. 1, pp. 447-463, Art No. 3100117, doi: 10.1109/JSTQE.2014.2333234.

(Continued)

*Primary Examiner* — Christopher Stanford
(74) *Attorney, Agent, or Firm* — Richard T. Ogawa; Ogawa P.C.

(57) ABSTRACT

In an example, the present invention provides a laser system. The laser system has a source laser (e.g., CBC) coupled to first mirror device opposing a second mirror device and configured to generate a resonating laser beam between the first mirror and the second mirror. In an example, the system has a piezoelectric device configured to the second mirror device and characterized by a refractive e index such that one or more voids is changed by applying an energy to the piezo electric device to cause a change in a value of the refractive index, e.g., by more than 0.0001, to allow the resonating laser beam or a portion of the resonating laser to traverse through a portion of the second mirror device.

25 Claims, 21 Drawing Sheets

(56) References Cited

U.S. PATENT DOCUMENTS

| | | | |
|---|---|---|---|
| 10,660,192 B2 | 5/2020 | Campbell et al. | |
| 11,067,848 B1 * | 7/2021 | Ouderkirk | G02B 26/001 |
| 11,387,007 B2 | 7/2022 | Moses et al. | |
| 11,515,463 B1 * | 11/2022 | Wells | H04R 17/00 |
| 11,526,129 B1 * | 12/2022 | Ouderkirk | G03H 1/0272 |
| 2003/0002610 A1 | 1/2003 | Panarella | |
| 2009/0000268 A1 | 1/2009 | Yurash | |
| 2011/0235669 A1 | 9/2011 | Deri et al. | |
| 2011/0261919 A1 | 10/2011 | Sefcik et al. | |
| 2013/0064340 A1 | 3/2013 | Latkowski et al. | |
| 2014/0138359 A1 | 5/2014 | Carr et al. | |
| 2014/0348283 A1 | 11/2014 | Perkins et al. | |
| 2018/0211732 A1 | 7/2018 | Perkins | |

FOREIGN PATENT DOCUMENTS

| | | | |
|---|---|---|---|
| WO | 2012064767 A1 | 5/2012 | |
| WO | 2013070683 A1 | 5/2013 | |
| WO | 2013133885 A1 | 9/2013 | |
| WO | 2013165469 A2 | 11/2013 | |
| WO | 2014113100 A2 | 7/2014 | |
| WO | 2014130127 A2 | 8/2014 | |
| WO | 2014160128 A1 | 10/2014 | |
| WO | 2015021403 A1 | 2/2015 | |

OTHER PUBLICATIONS

Y. Hosaka et al., "Mode-locked pulse oscillation of a self-resonating enhancement optical cavity" Journal of Physics: Conference Series. 1350. 10.1088/1742-6596/1350/1/012028, Oct. 2016.

H. Fathi et al. "Towards Ultimate High-Power Scaling: Coherent Beam Combining of Fiber Lasers" Photonics; Dec. 10, 2021; 45 pages.

C.G.R. Geddes et al. "High-quality electron beams from a laser wakefield accelerator using plasma-channel guiding" Letters to Nature/Nature Publishing Group; Sep. 30, 2004; 538-541; vol. 431.

M.R. Edwards et al. "The X-Ray Emission Effectiveness of Plasma Mirrors: Reexamining Power-Law Scaling for Relativistic High-Order Harmonic Generation" Scientific Reports; Mar. 20, 2020; 20 pages.

H. Collins et al., "Investigation and optimization of N-polar GaN porosification for regrowth of smooth hillocks-free GaN films" Applied Physics letters; Jul. 30, 2021; pp. 042105-1-042105-5; No. 119.

L. Ghazaryan et al. "Nanoporous SiO2 thin films made by atomic layer deposition and atomic etching" Nanotechnology; May 13, 2016; 10 pages; No. 27.

* cited by examiner

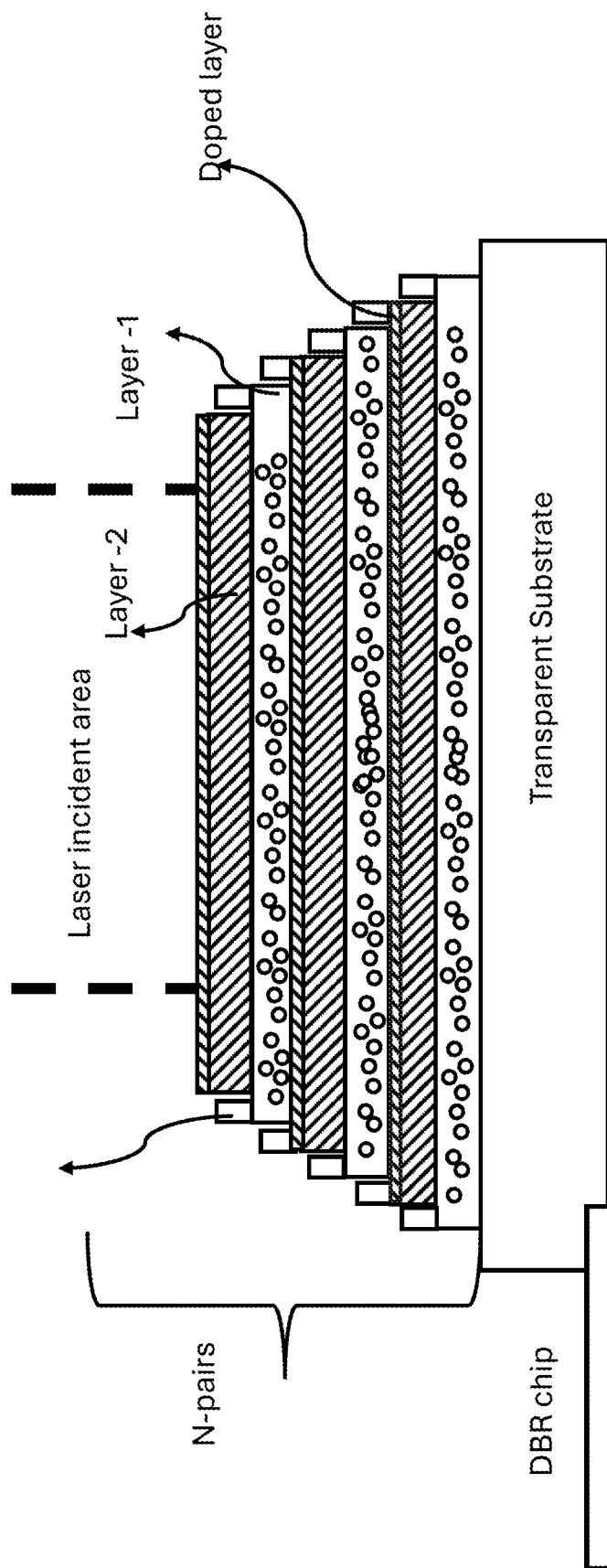
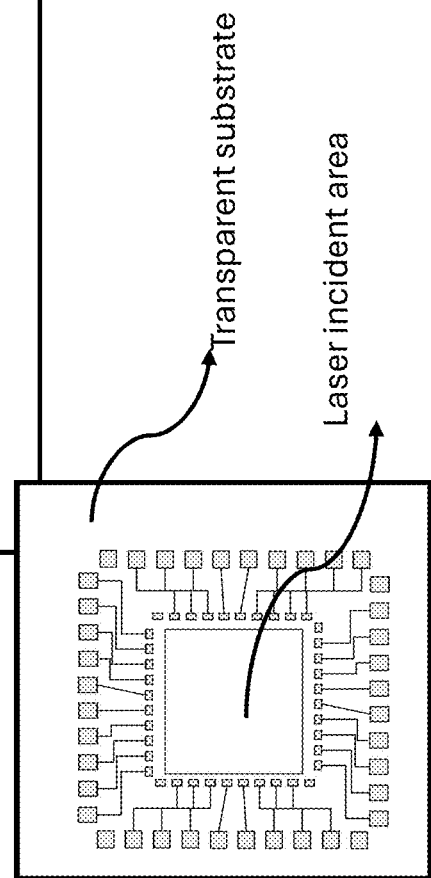
Figure 7 (a)
Figure 7 (b)

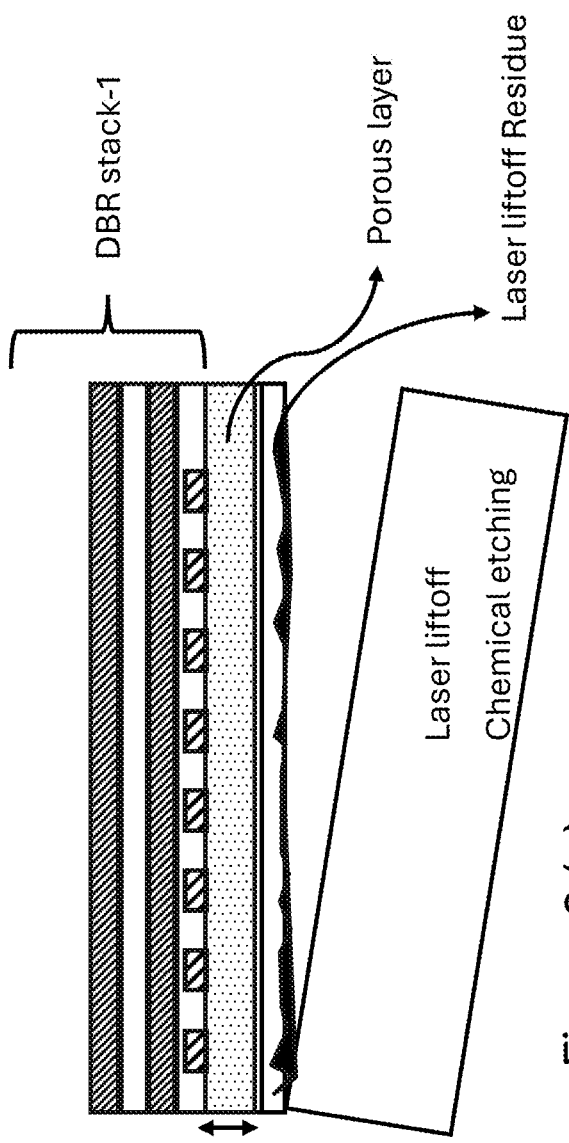
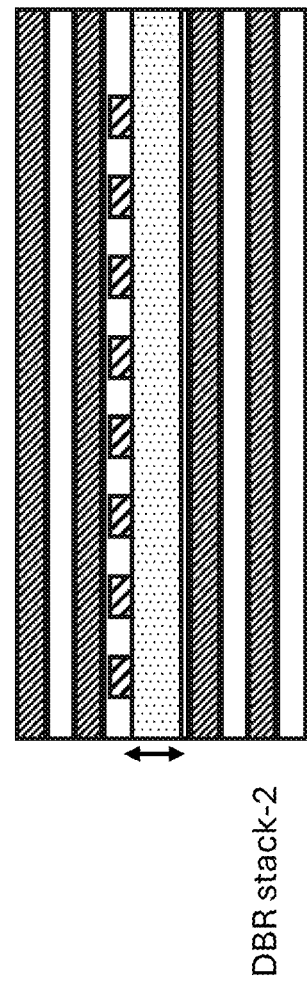
Figure 9 (c)
Figure 9 (d)

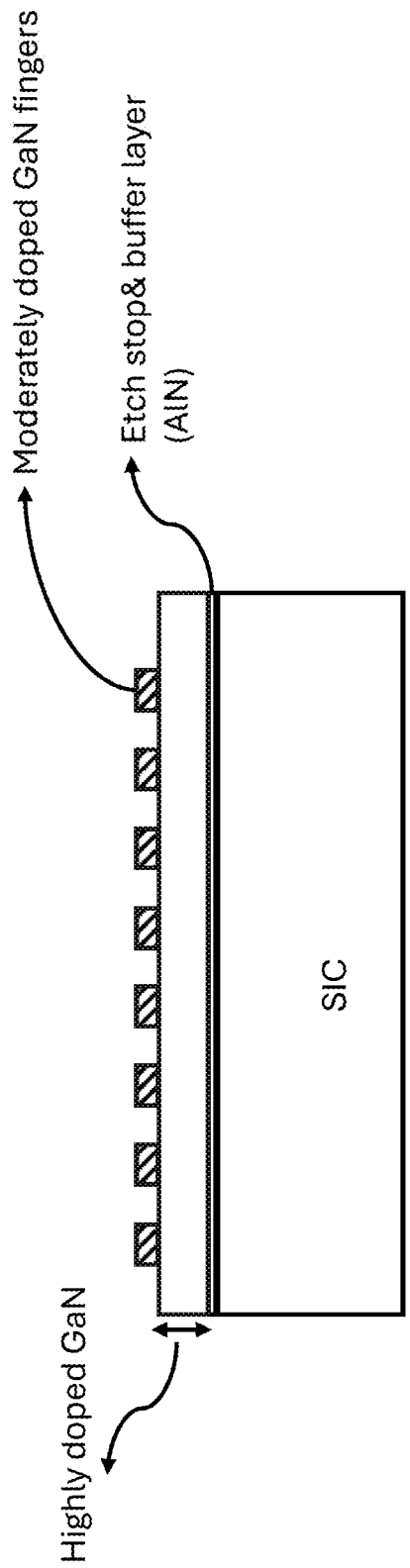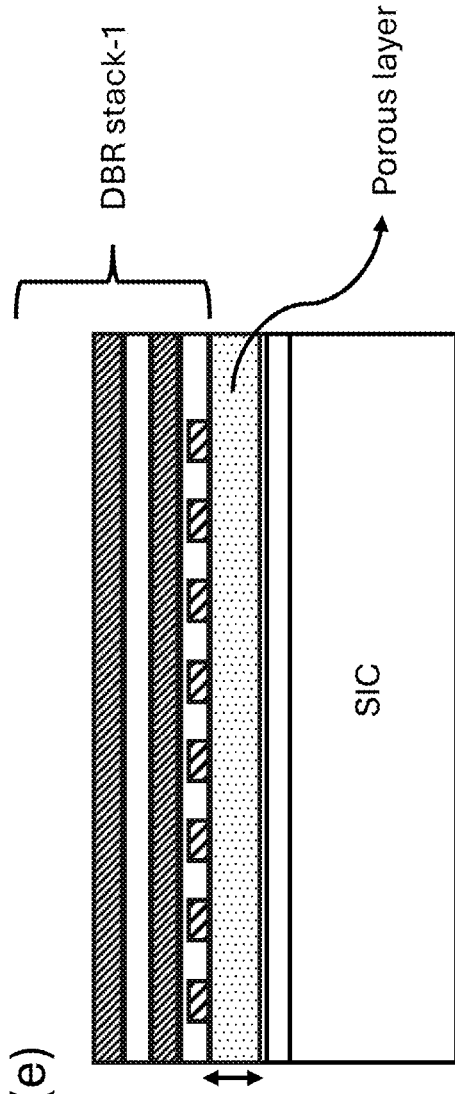
Figure 9 (e)
Figure 9 (f)

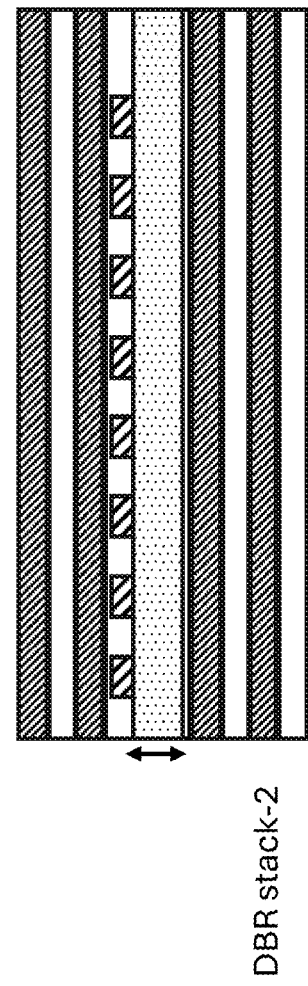
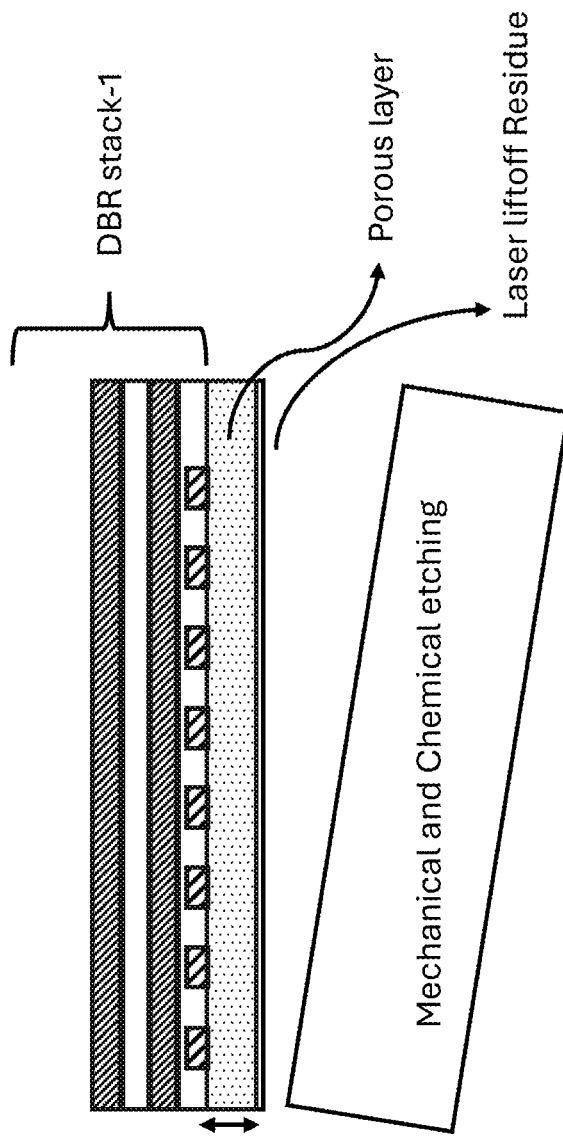
Figure 9 (g)
Figure 9 (h)

LASER BEAM EXTRACTION USING DISTRIBUTED BRAGG REFLECTOR (DBR) MIRROR SYSTEMS WITH A PIEZOELECTRIC LAYER

BACKGROUND OF THE INVENTION

The present invention relates generally to fusion energy generation techniques. In particular, the present invention provides a laser system and method for fusion energy, related methods, and more particularly techniques for dumping the laser from a cavity region. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

From the beginning of time, human beings have developed energy sources from natural materials such as wood, coal, oil, and gas products. Unfortunately, burning wood and coal leads to major pollution issues, including adding undesirable carbon particles into the atmosphere. Oil and gas products also have similar limitations and have been a leading cause of "global warming." Renewable energy sources including nuclear, wind, hydroelectric, and solar are promising. However, such renewable energy sources have other shortcomings. Wind only works if the wind is blowing. Solar cannot be used when the sun goes down. Hydroelectric is limited to areas with water, and nuclear, although promising, has had major problems in generating waste and unreliable and dangerous reactors. One other promising energy source has been fusion energy.

Fusion energy is a type of energy production that occurs when two atomic nuclei fuse together, releasing a large amount of energy in the process. It is considered a potential source of clean and abundant energy, as the fuel for fusion reactions (mainly hydrogen) is abundant on Earth and the reactions produce no greenhouse gases or other harmful pollutants.

There are two main approaches to achieving fusion reactions: inertial confinement fusion (ICF) and magnetic confinement fusion (MCF).

Inertial confinement fusion (ICF) involves using high-energy lasers or particle beams to compress and heat a small pellet of fuel, causing it to fuse. The main advantage of ICF is that it can potentially produce fusion reactions with a relatively small amount of fuel and at a relatively low cost. However, the process is still in the experimental stage and there are significant technical challenges to before it can be considered a desirable source of energy.

Magnetic confinement fusion (MCF) involves using strong magnetic fields to contain and heat a plasma (a hot, ionized gas) of hydrogen fuel, causing it to fuse. The most common type of MCF is called tokamak fusion, which uses a toroidal (doughnut-shaped) chamber to contain the plasma. The plasma is held in the center of the chamber by strong magnetic fields, which are created by running current through a set of coil windings around the chamber. The plasma is heated by injecting energy into it, either through particle beams or through electromagnetic waves.

The main advantage of MCF is that it has the potential to produce fusion reactions on a larger scale, making it more suitable for generating electricity. However, it is a more complex and costly process than ICF and there are still significant technical challenges to overcome before it can be considered a desirable source of energy.

Both ICF and MCF have made significant progress in recent years and there are several experimental facilities around the world working on these technologies. However, achieving sustained fusion reactions with net energy production (meaning the energy produced by the fusion reactions is greater than the energy required to initiate and sustain the reactions) remains a major technical challenge.

There are also other approaches to fusion energy being explored, such as magnetized target fusion and muon-catalyzed fusion. However, these approaches are still in the early stages of development. It is not yet clear if fusion energy will be viable as a source of energy.

From the above, fusion energy has the potential to be a clean and abundant source of energy, but significant technical challenges must be overcome before it can be considered a practical source of energy.

SUMMARY OF INVENTION

According to the present invention, techniques related generally to fusion energy generation techniques are provided. In particular, the present invention provides a laser system and method for fusion energy, related methods, and more particularly techniques for dumping the laser from a cavity region. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

In an example, the present invention provides a laser system. The laser system has a source laser (e.g., CBC) coupled to first mirror device opposing a second mirror device and configured to generate a resonating laser beam between the first mirror and the second mirror. In an example, the system has a piezoelectric device configured to the second mirror device and characterized by a refractive index such that one or more voids is changed by applying an energy to the piezo electric device to cause a change in a value of the refractive index, e.g., by more than 0.0001, to allow the resonating laser beam or a portion of the resonating laser to traverse through a portion of the second mirror device.

In an example, the energy is provided using an acoustic wave or an electric field. In an example, the energy induces the refractive index change greater than in a bulk piezoelectric layer without voids. In an example, the voids comprises one or more pores, open regions, or other structures. In an example, the change in the value is more than 0.01. In an example, the piezoelectric device is configured to extract a laser beam from a cavity between the first mirror and the second mirror. In an example, the cavity is a Fabry Perot cavity or an optical enhancement cavity (OEC).

In an alternative example, the present invention provides a Variable Reflectance Distributed Bragg Reflector (VR-DBR) mirror device. The device has a transparent substrate, e.g., optically transparent. In an example, the device has a plurality of stacked layers of materials with at least two different refractive indices to form a distributed Bragg reflector (DBR) overlying the transparent substrate. In an example, the device has a piezoelectric layer comprising a plurality of voids configured with a single or the plurality of stacked layers such that the piezoelectric layer is configured to the DBR. In an example, the device has at least one electrical contact coupled to the piezoelectric layer containing the voids, the electrical contact characterized by a conductive material. In an example, the device has an electric energy (e.g., power) coupled to the electrical contact and configured to supply an electric field in the piezoelectric layer containing the voids to alter a refractive index of the piezoelectric layer and change a reflection spectrum of the DBR to allow a laser beam to traverse through a portion of the DBR.

Depending upon the example, the present invention can achieve one or more of these benefits and/or advantages. In an example, the present invention provides a fusion energy system including a high intensity pulse or CW laser system configured with a reactor in a compact and spatially efficient system and related methods. In an example, the high intensity pulse or CW laser system provides enough energy to ignite and sustain fusion energy within the reactor. In an example, the present invention allows a laser beam to be dumped from a cavity. In an example, the present invention offers advantages of generating fusion power through an efficient size, weight, and cost using the present high intensity lasers. In an example, the present system and method is configured to reduce or eliminate parametric instabilities. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE SPECIFIC EXAMPLES

Figure 1:
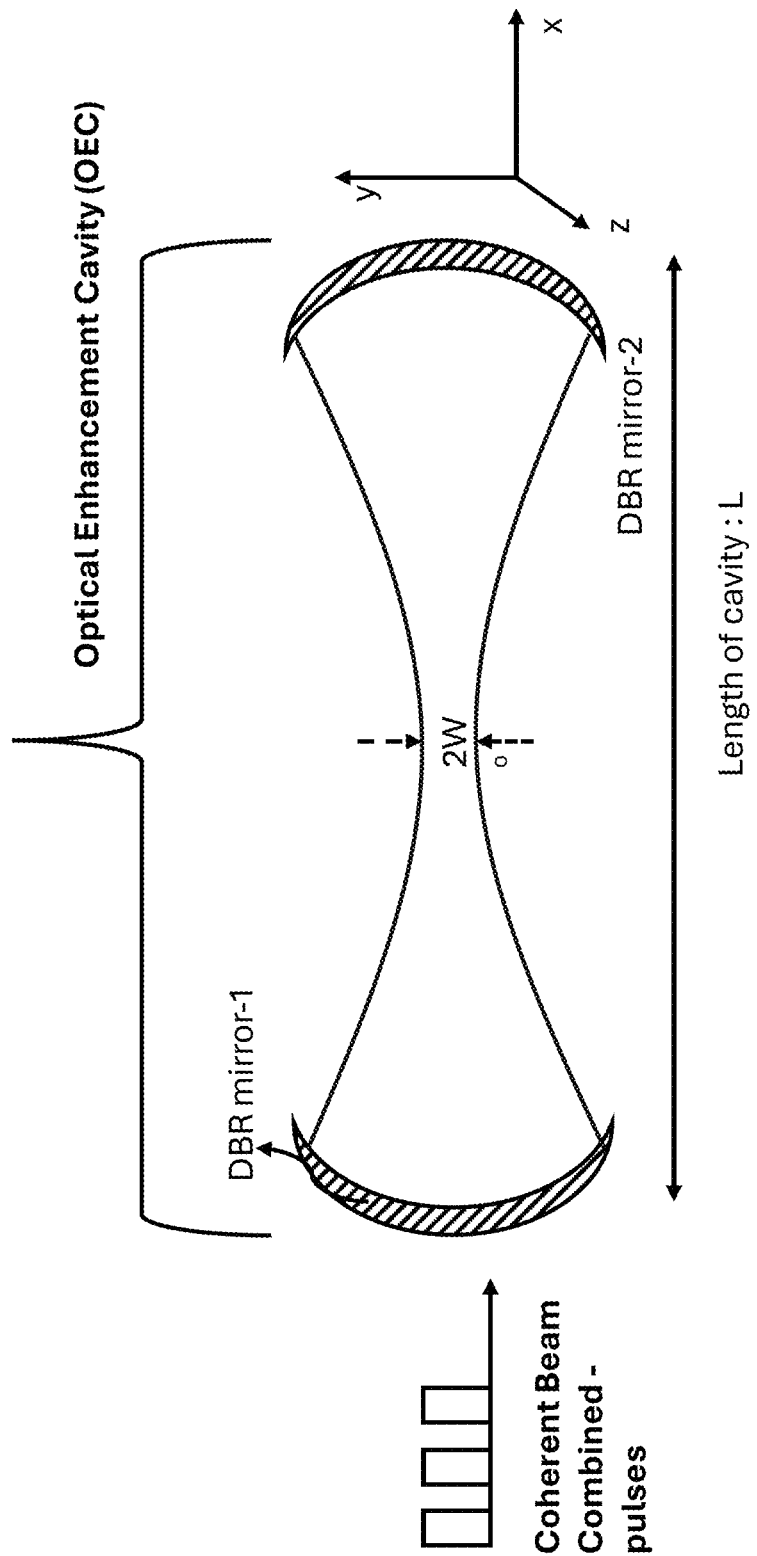
FIG. 1 is a simplified representation of a (coherent beam combination laser) CBC and an (optical enhancement cavity laser) OEC in an example of the present invention.

According to the present invention, techniques related generally to fusion energy generation techniques are provided. In particular, the present invention provides a laser system and method for fusion energy, related methods, and more particularly techniques for dumping the laser from a cavity region. Merely by way of example, the invention can be applied to a variety of applications, including energy generation for power, spaceships, travel, other vehicles for air, land, and water, defense applications (e.g., satellite, aerospace, land and missile defense, submarines, boats), biotechnology, chemical, mechanical, electrical, and communication and/or data applications.

The present invention describes a system that allows for the fast removal or "dumping" of stored laser light in a cavity. The laser cavity is formed by two mirrors and includes the free space between them. The laser cavity can be used to amplify an input laser's power. This can be accomplished by controlling the timing and phase of the input laser, such that multiple pulses are injected and then stored in the cavity as a single high energy pulse.

The cavity is composed of two concave mirrors, both suspended at each end of the cavity, and includes the free space between them, as well as the specialized mounts capable of fine adjustment. The enhancement cavity, when driven by a pre-amplified laser pulsed at a megahertz repetition rate, creates an increasingly powerful propagating pulse between the cavity mirrors.

In an example, by utilizing coherent beam combining (CBC) and optical enhancement cavities (OEC), high-power laser beams can be generated by stretching, amplifying, and subsequently compressing laser pulses, achieving dramatic peak powers ranging from gigawatts (GW) [1] to petawatts (PW). These high-power laser beams have facilitated progress in compact electron and ion accelerators [2], x-ray sources [3], and the generation of antimatter jets [4]. Despite these significant advancements, certain applications are limited by the physical constraints and damage thresholds of the optical components used in current laser systems. The intensity limit of solid-state optics, approximately $10^{12}$ W/cm$^2$, is perilously close to the ionization threshold of most materials. This proximity means that even with advancements in optical coatings, improvements remain marginal. To achieve intensities beyond $10^{13}$ W/cm$^2$, alternative approaches are required to avoid the limitations of solid-state optics.

In this application, we propose methods to extract high-power laser beams from one of the DBR mirrors in the OEC. We provide a hybrid distributed Bragg reflector (DBR) mirror system, where the photo-elastic phenomenon is used to alter the reflective spectrum of DBR layers. This scheme can create a tunable piezo-optomechanical cavity system by introducing surface acoustic waves (SAWs), bulk acoustic waves (BAWs) or electric field into the DBR layers. Under the actuation of these acoustic waves, the Bragg mirrors, with at least one layer containing piezoelectric characteristics, can be effectively coupled to the generated waves. Conventional acousto-optic modulators (AOMs) or piezoelectric modulator offer a refractive index contrast of only 0.0001, which is insufficient for significant reflective spectrum shifts in DBR mirrors unless the contrast changes by two orders of magnitude. Consequently, AOMs introduce unnecessary absorption loss and decrease system efficiency when used before DBR mirrors. Accessing the laser beams through DBR mirror systems is practical because the mirror sizes can be increased to two (2) inches or more, which dilutes the energy density on a mirror material.

To address this, we focus on extracting the high-power laser beam through one or certain of the DBR mirrors, specifically the mirror opposite the coherent beam combining (CBC) laser injection mirror. Acoustic waves or electric field in piezoelectric crystals should introduce a refractive index contrast larger than 0.001 to achieve a significant reflectivity shift. DBR mirrors can handle higher energy levels by increasing the mirror area, making them ideal for steering, deflecting or transmitting high-power laser beams. This method leverages the inherent advantages of DBR mirrors in handling high-power lasers, ensuring efficient and effective extraction of the laser beam by transmitting high-power laser beams through the DBR mirror. We propose using at least one piezoelectric crystal layer and introducing pores or voids (intentionally) to achieve a larger refractive index contrast. This comprehensive approach overcomes the limitations of current DBR systems, paving the way for the next generation of high-power laser and many electrical-optic applications in fields such as nuclear fusion and others, where precise control of high-power laser beams is desirable.

Nanoporous semiconductors have emerged as significant materials in optoelectronics due to their properties, particularly in modifying the refractive index through the introduction of porosity. Semiconductors such as GaN [4], GaAs, LiNbO$_3$, LiTaO$_3$, and ZnO exhibit desirable optical characteristics when made porous. The incorporation of nanopores—voids typically ranging from 5 to 15 nanometers in diameter—introduces significant changes in the material's refractive index and optical behavior. These nanopores are randomly shaped, reflecting the crystal geometry of the materials, which leads to a highly variable and tunable refractive index. This makes nanoporous semiconductors versatile materials for a range of applications, including sensors, photonic devices, and high-reflectivity coatings for lasers.

The process of creating porosity in semiconductors involves several sophisticated techniques. One common method is electrochemical etching, which uses an electric current to dissolve parts of the semiconductor material, forming pores. This method allows precise control over the size and distribution of the pores by adjusting the etching parameters such as voltage, current density, and etching time. Another technique involves the use of ion implantation followed by thermal annealing, where ions are implanted into the semiconductor substrate to create damage, and subsequent annealing helps in the formation of pores. Additionally, metal-assisted chemical etching (MACE) has been employed [5], where a metal catalyst facilitates the etching process, leading to the formation of porous structures. These methods enable the fabrication of nanoporous semiconductors with tailored properties suitable for specific applications.

Surface Acoustic Waves (SAWs), Bulk Acoustic Waves (BAWs) and electric field play a desirable role in modulating the optical properties of nanoporous semiconductors. SAWs are mechanical waves that travel along the surface of a piezoelectric material, causing periodic undulations. These waves can reach heights of several hundred picometers, depending on their frequency and intensity. In a bulk material, SAWs cause surface undulations, but in nanoporous semiconductors, these waves interact with the irregularly shaped voids, leading to complex surface and volume modulations. Bulk Acoustic Waves, on the other hand, propagate through the material's interior. In nanoporous semiconductors, BAWs interact with the voids, causing changes in the material's mechanical and optical properties. The interaction between acoustic waves and nanoporous structures results in dynamic modulation of the refractive index, significantly impacting the material's optical behavior.

In nanoporous semiconductors, the introduction of pores or voids lowers the average refractive index because the voids, filled with air or other low-refractive-index materials, create a composite medium with a lower effective refractive index than bulk materials. For instance, in nanoporous GaN, the refractive index can be significantly lower than that of bulk GaN, which is approximately 2.3. The refractive index of nanoporous materials can be calculated using the volume average theory (VAT), which considers the porosity and the refractive indices of the constituent materials. When SAWs or BAWs travel through nanoporous semiconductors, they cause mechanical deformations in and around the pores. These deformations can enhance or dampen the wave propagation depending on the crystal orientation of the void surfaces, leading to a dynamic modulation of the refractive index. This change in the refractive index, often exceeding 0.001, is sufficient to shift the reflection spectrum of DBRs or alter the resonant peak of optical cavities.

The introduction of porosity in semiconductors offers several advantages over their non-porous counterparts. The high surface area of nanoporous semiconductors enhances light-matter interactions, making them ideal for sensors and photodetectors. The ability to modulate the refractive index through porosity and acoustic waves allows for the design of tunable optical devices. Additionally, the porous structure can improve thermal management by facilitating better heat dissipation. Nanoporous semiconductors can also be used to create high-reflectivity DBRs, desirable for applications in high-power lasers and optical cavities. The high refractive index contrast between bulk and nanoporous materials enables the development of efficient DBRs with low lattice mismatch. This makes nanoporous DBRs superior to conventional semiconductor DBRs in terms of reflectance and durability. The ability to fine-tune the refractive index through porosity and acoustic waves further enhances the performance of these DBRs, making them ideal for a wide range of optoelectronic applications.

Piezoelectric materials are selected for their desirable properties, which influence the efficiency and characteristics of the generated surface acoustic waves (SAWs) in an example.

Lithium Niobate ($LiNbO_3$)
    Acoustic Velocity: 3,730 m/s
    Piezoelectric Coupling Coefficient: $19 \times 10^{-12}$ $C/m^2$
Lithium Tantalate ($LiTaO_3$)
    Acoustic Velocity: 3,360 m/s
    Piezoelectric Coupling Coefficient: $19 \times 10^{-12}$ $C/m^2$
Quartz ($SiO_2$)
    Acoustic Velocity: 3,150 m/s
    Piezoelectric Coupling Coefficient: $2.3 \times 10^{-12}$ $C/m^2$
Zinc Oxide (ZnO)
    Acoustic Velocity: 2,680 m/s
    Piezoelectric Coupling Coefficient: $12.3 \times 10^{-12}$ $C/m^2$
Aluminum Nitride (AlN)
    Acoustic Velocity: 5,800 m/s
    Piezoelectric Coupling Coefficient: $5.5 \times 10^{-12}$ $C/m^2$
Gallium Nitride (GaN)
    Acoustic Velocity: 5,970 m/s
    Piezoelectric Coupling Coefficient: $3.1 \times 10^{-12}$ $C/m^2$ In an example, Gallium Nitride (GaN) is desirable in acousto-optic applications due to its excellent thermal stability, wide bandgap, and high electron mobility. The acoustic wave amplitudes in GaN vary with different crystal orientations. In the C-plane (0001) orientation, GaN exhibits strong piezoelectric coupling, resulting in high SAW amplitudes, approximately 200-300 pm/V for Rayleigh waves. The A-plane (11-20) orientation supports shear horizontal SAWs (SH-SAWs) with amplitudes around 150-200 pm/V, suitable for sensor applications. The M-plane (1-100) orientation allows for significant flexibility in minimizing polarization effects, producing SAW amplitudes of about 250 pm/V. These characteristics make GaN suitable for high-frequency and high-power applications, including filters and sensors.

In an example, Zinc Oxide (ZnO) is desirable for its high piezoelectric constants and ease of thin-film deposition. In the C-axis (0001) orientation, ZnO demonstrates excellent SAW properties with acoustic wave amplitudes reaching up to 300-400 pm/V for Rayleigh waves, making it ideal for high-sensitivity sensors and high-frequency SAW devices. The A-axis (11-20) orientation, supporting SH-SAWs, offers wave amplitudes of around 200-300 pm/V, beneficial for biosensors and chemical sensors where horizontal polarization is advantageous. M-plane (1-100) ZnO also provides substantial acoustic wave amplitudes of approximately 250-350 pm/V, making it versatile for various acoustic applications, including transducers and actuators.

In an example, Lithium Niobate ($LiNbO_3$) is desirable for its strong piezoelectric and electro-optic properties, making it a staple in acousto-optic and piezoelectric devices. The Z-cut (0001) orientation of $LiNbO_3$ is optimal for longitudinal bulk acoustic waves, with amplitudes reaching up to 200-300 pm/V, ideal for high-power optical modulators. The Y-cut (11-20) orientation excels in generating high-amplitude SAWs, with typical values of around 150-250 pm/V, widely used in SAW filters and resonators. The 128° Y-cut orientation is particularly notable for maximizing SAW amplitudes, achieving values as high as 300-400 pm/V, extensively employed in high-performance SAW devices. These variations in acoustic wave amplitudes across different crystal orientations highlight $LiNbO_3$'s adaptability for precision acoustic wave applications in communication and sensing technologies.

In an example, Gallium Arsenide (GaAs) is another important material used in acousto-optic devices due to its high electron mobility and direct bandgap. In the C-plane (100) orientation, GaAs can generate significant SAW amplitudes, around 150-200 pm/V, suitable for high-frequency applications. The A-plane (110) orientation supports moderate SAW amplitudes, approximately 100-150 pm/V, which can be used for various sensing applications. The Z-plane (111) orientation is also used for specific high-efficiency SAW devices, providing amplitudes in the range of 150-250 pm/V. These properties make GaAs versatile for use in both communication and sensing technologies, particularly where high-frequency and high-efficiency are required.

In an example, a summary of each of the drawings are provided below.

FIG. 1 illustrates an example of a coherent beam combining (CBC) and optical enhancement cavity (OEC). The OEC comprises of two distributed Bragg Reflector (DBR) mirrors, designed with a radius of curvature that focuses the beam at the center of the OEC length. This configuration concentrates the high-power beam halfway between the two mirrors. The desired cavity length for these systems can range from 0.5 meters to 200 meters. One DBR mirror sits on the CBC side, and another DBR mirror sits opposite to it.

In an example, the present mirror has a change in refractive index that allows a propagating beam resonating within the cavity to traverse through the second mirror outside of the cavity thereby dumping the beam outside of the cavity.

Figure 2:
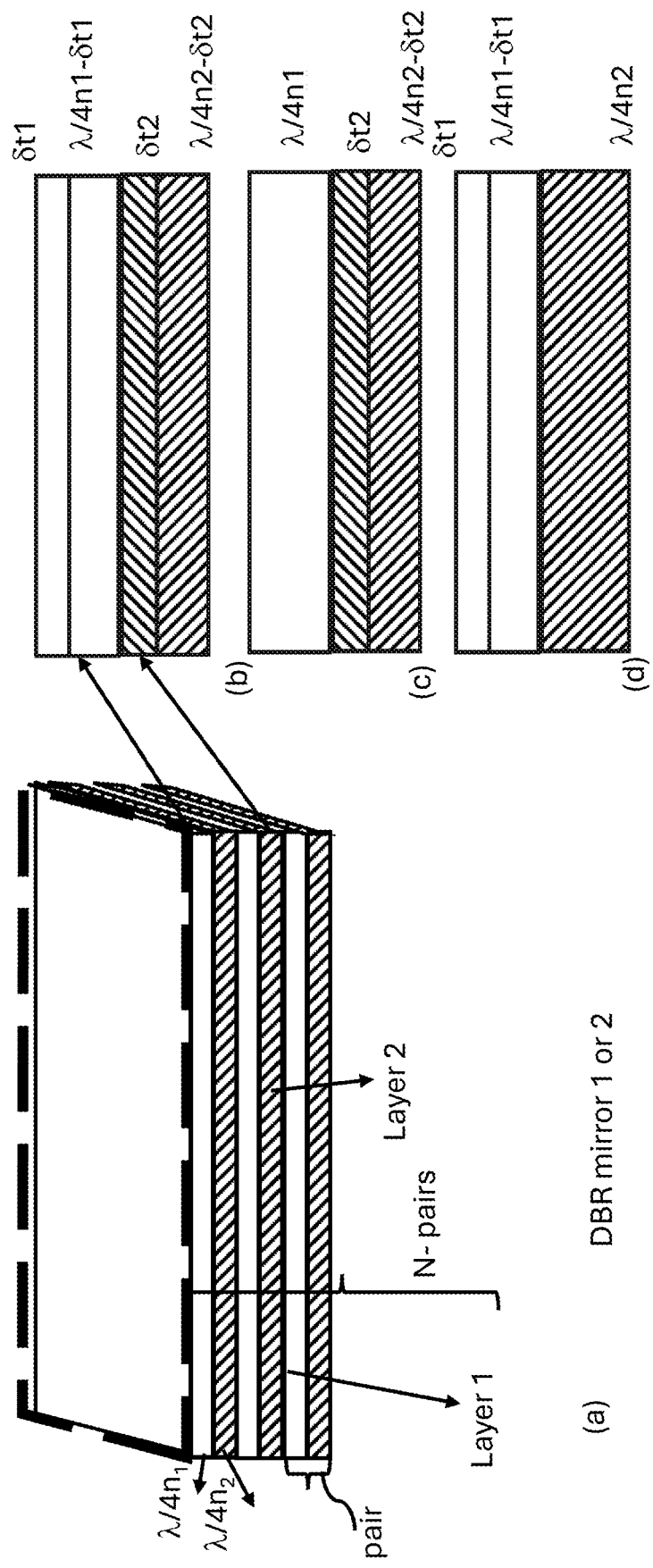
FIG. 2 shows a simplified schematic of DBR (Distributed Bragg Reflector) layer types: (a) DBR structure with layer 1 and layer 2, each layer being a quarter wavelength thick, (b) a variation where every thin layer of each quarter wavelength is slightly doped to accommodate ohmic contact, (c) and (d) where one of the two layers' thin portion is doped in an example of the present invention.

FIG. 2 illustrates different DBR layer types. FIG. 2(a) provides an example of a DBR mirror, where pairs of materials with refractive indices n1 for material 1 and n2 for material 2 are stacked together in an example. Each material in the pair has a thickness of $\lambda/4n1$ and $\lambda/4n2$, respectively, where $\lambda$ is the high-power laser wavelength. By stacking several such pairs, high reflectivity is achieved. FIGS. 2(b) to 2(d) showcase different combinations of semiconductor quarter-wavelength layers that can be stacked without deviating from the reflective spectrum. FIG. 2(b) shows a combination where a thin portion of each quarter-wavelength layer is moderately doped to alter the refractive index by injecting carriers when an electric field is applied. FIGS. 2(c) and 2(d) show configurations where only one layer of the two is moderately doped.

Figure 3:
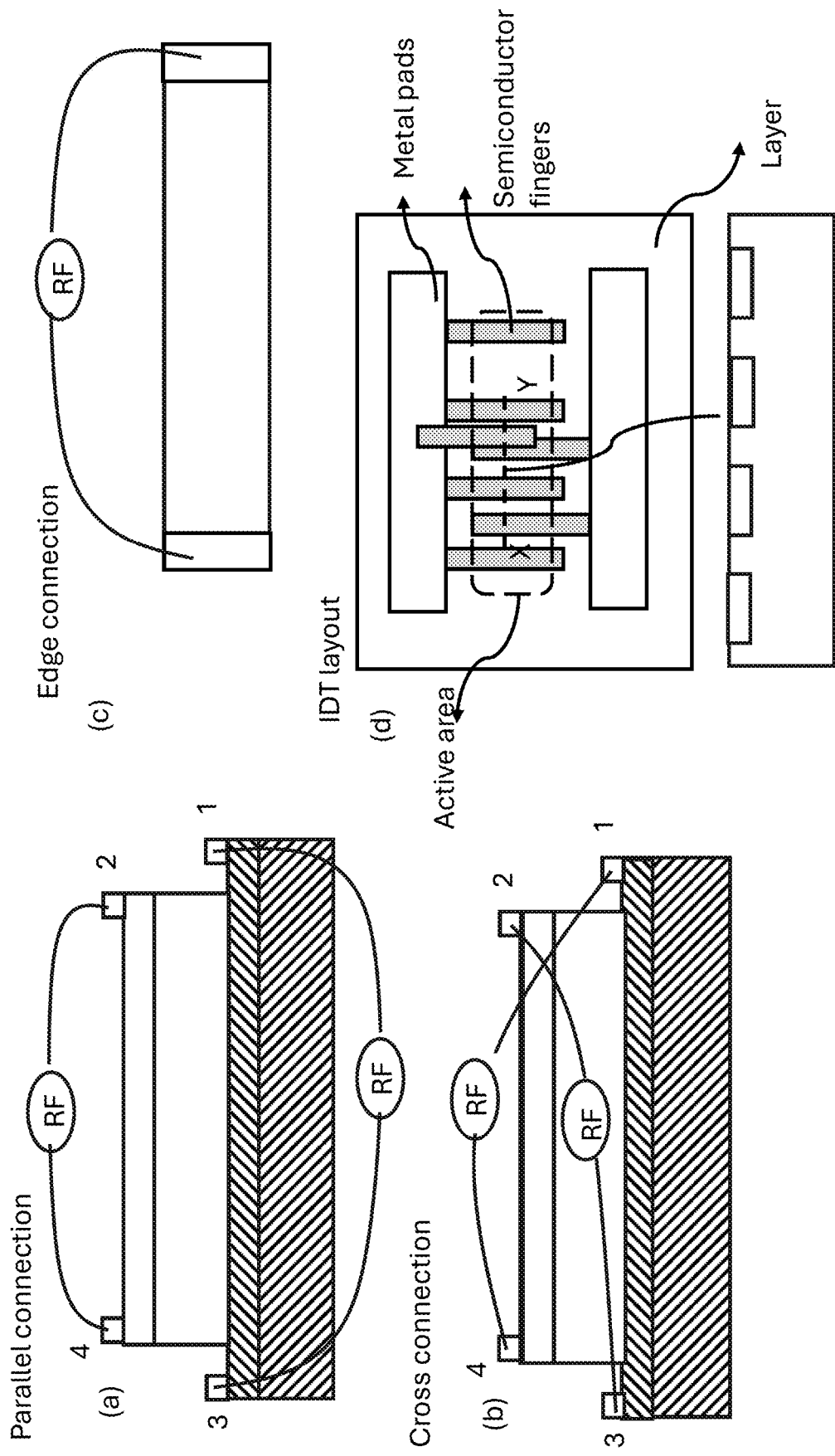
FIG. 3 shows different simplified connection types: (a) parallel connection, where a layer is connected by two contacts on either end, (b) cross connections, generally requiring the FIG. 2b type layer combination, where one contact from each layer is used to send an RF (radio frequency) signal into a semiconductor layer, (c) where one side of the layer is used as a contact for RF signal injection, (d) an interdigital transducer (IDT) type layout, where a thin doped layer is patterned to form an IDT shape that spreads the RF signal into the bulk and on the surface evenly in an example of the present invention.

FIG. 3 represents different types of possible electrical connections. Moderately doped layers help in spreading the electric field throughout the layer uniformly when connected in a parallel configuration in an example. This is even more effective when a cross-connection is established, as shown in FIG. 3(b). FIG. 3(c) shows a connection that only connects one side of the layer. When multiple DBR layers are arranged to form a mirror, a fabrication process is carried out to expose the sides of all the layers, and metal is deposited to spread the RF field in the layer stack. The most effective configuration involves laying IDTs on one of the semiconductor layers, allowing SAW/BAW to propagate throughout the layer thickness without much decay and altering the refractive index of the layers.

Figure 4:
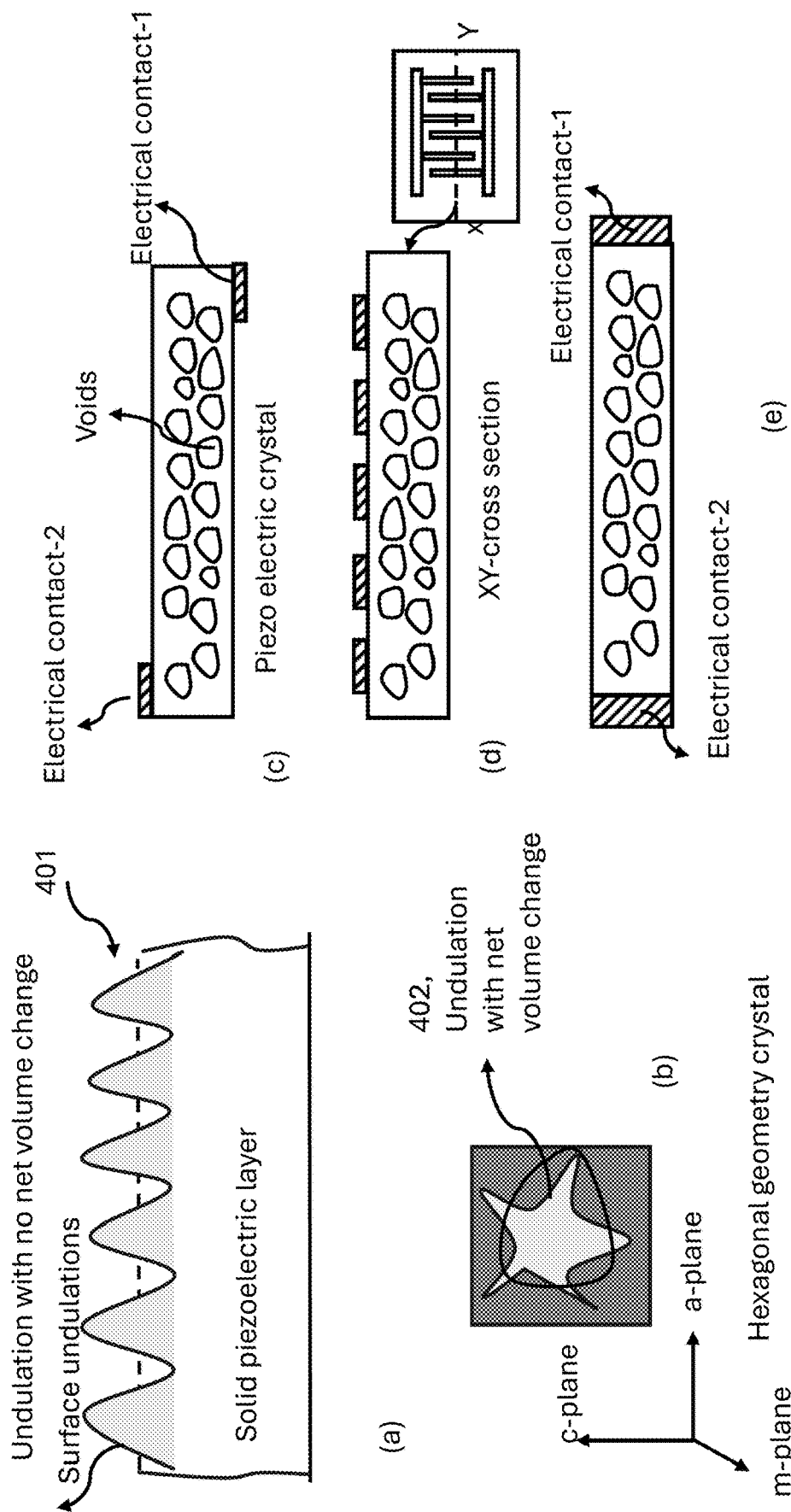
FIG. 4 is a simplified illustration of surface undulations in a solid piezoelectric layer and a void-containing layer: (a) shows a resulting net volume change due to SAW (surface acoustic wave) in a perfectly defined surface, (b) a random-shaped void, where SAW or BAW (bulk acoustic wave) are inhomogeneous and non-uniform due to crystalline sensitivity in piezo materials, resulting in a net volume change in a void when RF is applied, (c), (d), and (e) show the patterns of electrical connections possible for a voids/pores containing piezoelectric layer in an example of the present invention.

FIG. 4 illustrates the concept of a porous/void layer and acoustic wave coupling in an example. FIG. 4(a) shows the propagation of surface acoustic waves on a piezoelectric crystal material. Depending on the crystal orientation, surface acoustic waves create surface undulations with amplitudes of a few hundred picometers. FIG. 4(b) depicts a random-shaped void in the layer, with selective etching depending on the doping concentration, facilitating current in the layer and forming surface undulations in the void's internal surface. The undulation amplitude varies in different directions due to the undefined crystal orientation of the void. FIGS. 4(c), 4(d), and 4(e) show various connecting patterns for this void layer.

Figure 5:
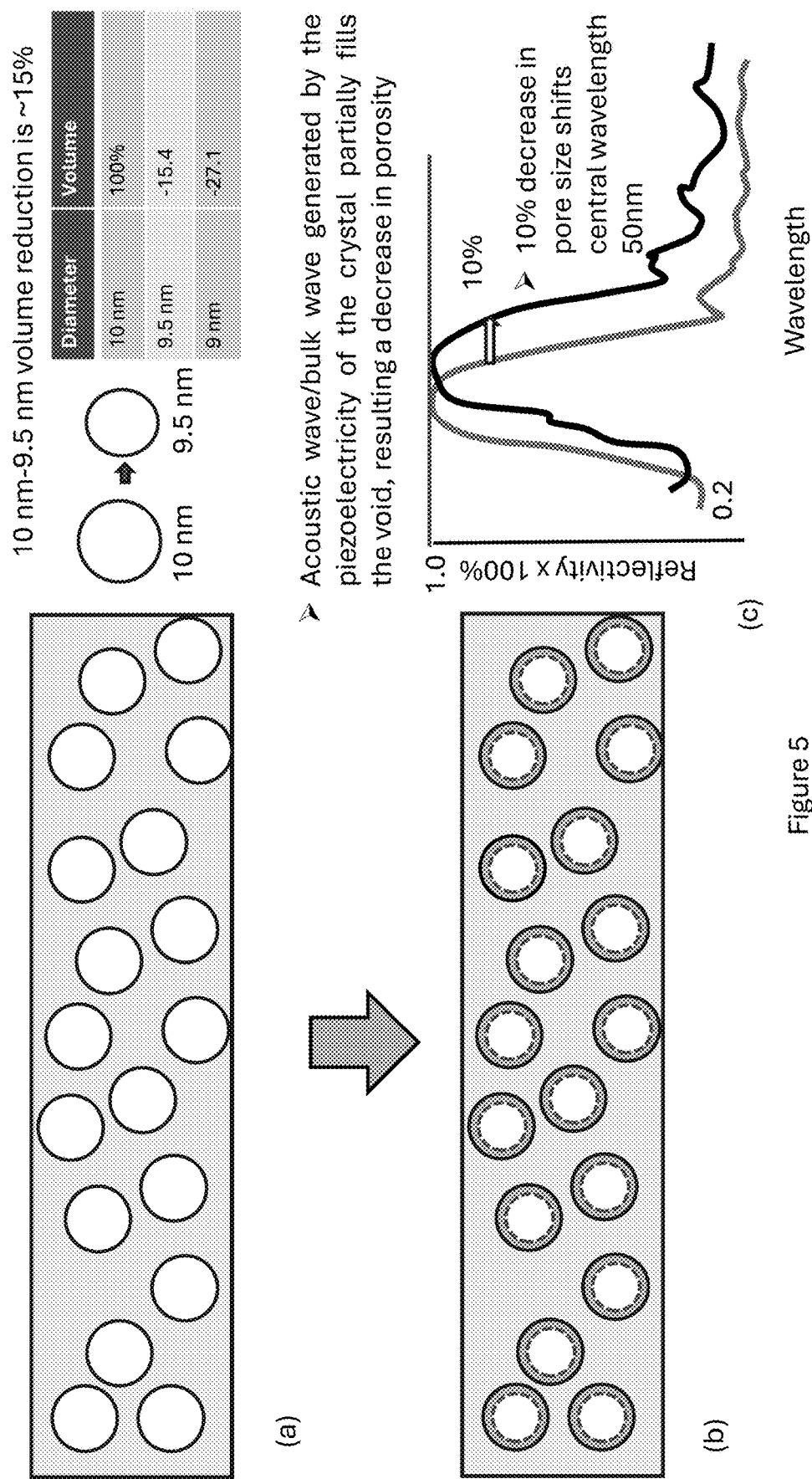
FIG. 5 is a simplified illustration shows the phenomenon of reflection spectrum shift when the porosity of a layer is changed: (a) voids/pores containing piezoelectric layer, (b) volume change in the voids due to the application of SAW/BAW, (c) reflectivity spectrum shift when 10% porosity change is added in an example of the present invention.

FIG. 5 illustrates the photoacoustic effect in a pores/voids-containing piezoelectric crystal layer in an example. FIG. 5(a) shows a pores-containing piezoelectric crystal layer, with voids/pores represented as circular for simplicity. FIG. 5(c) shows the reflection spectrum of the layer (light solid line). When an acoustic wave is applied using one of the discussed connecting methods, the net volume of the pores changes due to generated surface undulations. FIG. 5(b) provides a schematic of this effect. The reflection spectrum in FIG. 5(c) assumes a net volume shrinkage of 10%, with pore sizes changing from 10 nm to 9.5 nm, corresponding to an average shrinkage of 250 μm from the void's internal surface. The resulting reflection spectrum shift is illustrated in FIG. 5(c).

Figure 6:
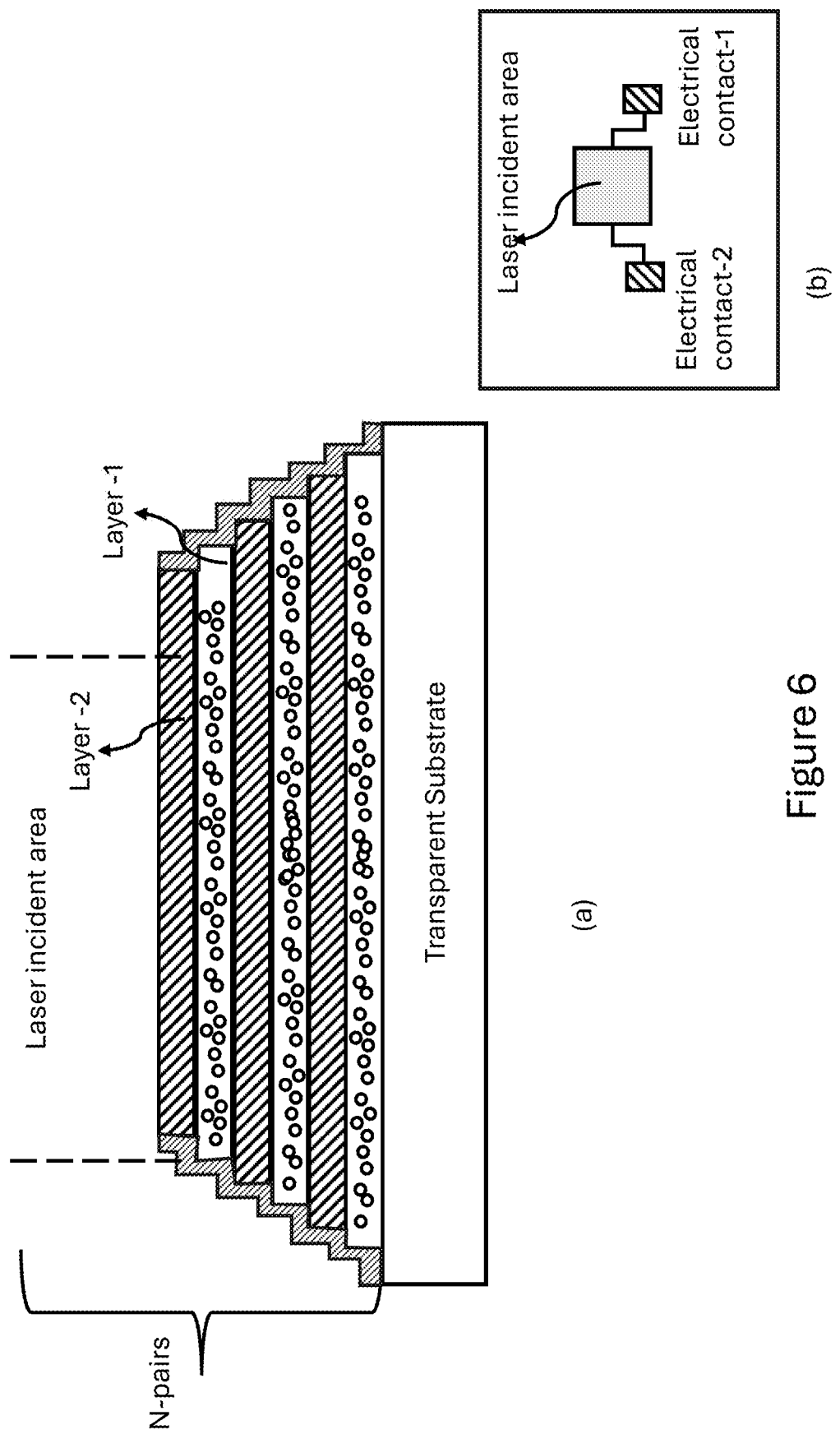
FIG. 6 is an example illustration where DBR mirror layers, at least one of them is pores/voids containing piezoelectric layer, and another example is a simplified pads configuration where sides of DBR layers are connected, resulting in a simple DBR chip configured with two pads in an example of the present invention.
Figure 7:
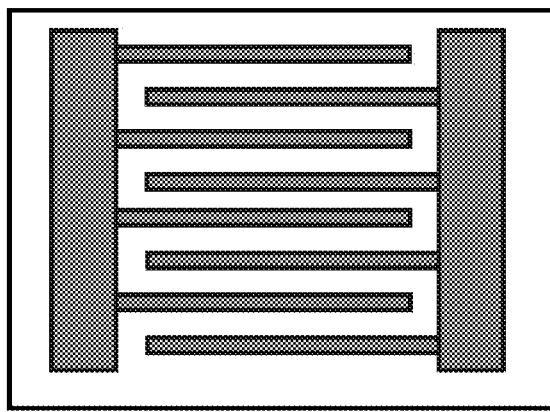
FIG. 7(a) is an example illustration where DBR mirror layers, at least one of them is pores/voids containing piezoelectric layer, and each layer is addressed with electrical connection pads, (b) a semiconductor DBR mirror chip containing 2N pads for a DBR mirror containing N-DBR pairs, where N is an integer, (c) is a DBR mirror, at least one layer of it is pores/voids containing piezoelectric layer, IDT layout patterns are formed on such layer, in order to simplify pads configuration IDT layouts formed at certain layers in the stock, (d) IDT layout seen from the surface in an example of the present invention.
Figure 7:
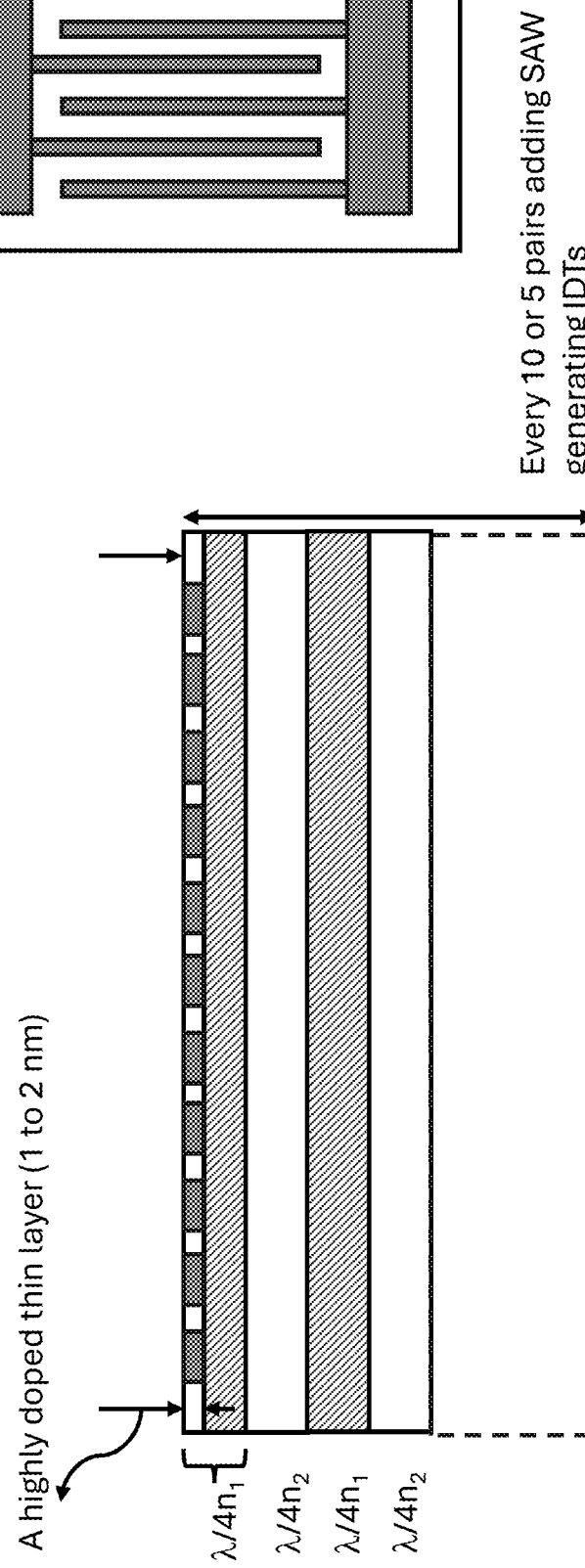

FIGS. 6 and 7 describe side layer contact patterns and individual addressable patterns to inject acoustic waves into the DBR layers in an example. The approach in FIG. 6 is analogous to Volume Bragg diffraction, which involves the use of a three-dimensional periodic structure, known as a Volume Bragg Grating (VBG), to diffract light through periodic variations in refractive index throughout the volume. VBGs are highly efficient for applications in laser systems. In piezoelectric crystals, their desirable properties allow for dynamic control of the refractive index within a VBG. When an electric field is applied to a piezoelectric crystal, it generates mechanical strain, modifying the periodic structure of the VBG and effectively tuning its diffraction properties. The refractive index contrast, which is the difference in refractive index between the regions of the grating, can be dynamically adjusted by applying an electric field. This process changes the atomic structure and alignment within the crystal lattice, leading to variations in the refractive index. In our case, there is a one-dimensional periodic refractive index change that already exists in the DBR layers. When acoustic waves are applied from the side, they generate a three-dimensional refractive index variation, acting as a VBG. Volume Bragg diffraction in piezoelectric crystals offers a powerful method for controlling light through refractive index modulation. FIG. 7 shows contact patterns that individually address semiconducting DBR layers and a semiconductor chip fabricated to address each layer.

Figure 8:
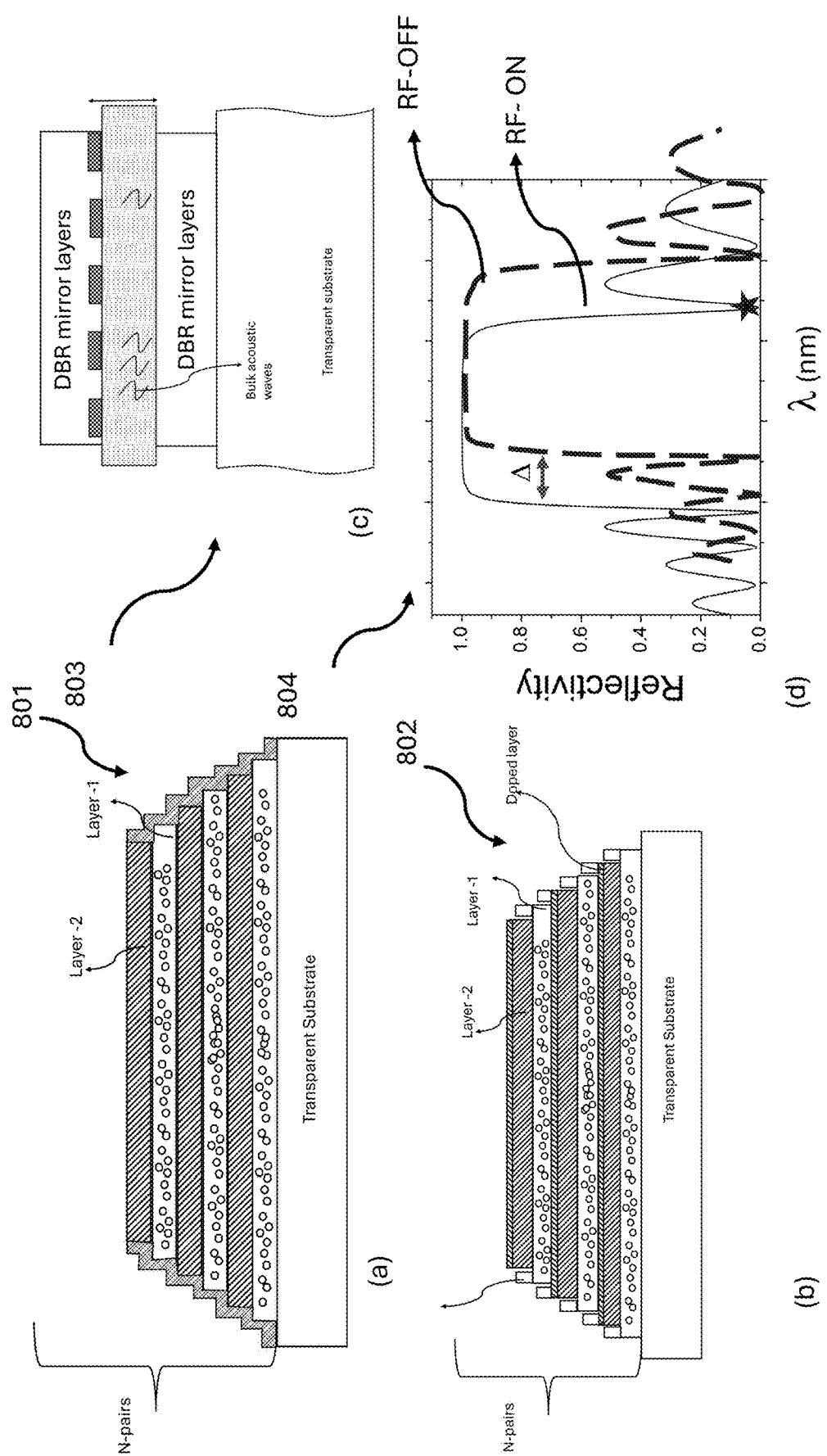
FIG. 8 is a simplified illustration that show proposed DBR mirror systems with at least one of the layers being a voids/pores containing piezoelectric layer is the reflection spectrum of DBR mirror system, showing two traces when acoustic waves are applied and not applied in an example of the present invention.

FIG. 8 illustrates proposed DBR mirror systems designed to shift the reflection spectrum by actively coupling acoustic waves to a porous/voids-containing piezoelectric layer in an example. FIG. 8, see reference (a), depicts a method of connecting the layers from the side, ensuring efficient coupling of the acoustic waves. FIG. 8, see reference (b) addresses each porous-containing layer of the DBR structure individually, allowing for precise control over the acoustic wave interactions. FIG. 8, see reference (c), shows a DBR mirror system where only one layer includes pores/voids, while the other layers can be either semiconductor or dielectric. The pores/voids-containing layer has piezoelectric properties, and its porosity is tailored to achieve the exact refractive index needed to complete the DBR pair. The activation of acoustic waves is carried out through an IDT layout, simplifying the overall DBR structure. The void-containing layer is prepared first, followed by the placement of the remaining DBR layers on the bottom and top to form a collective DBR system. FIG. 8, see reference (d), illustrates the mechanism of shifting the DBR mirror's reflective spectrum by comparing the effects of applying and not applying the RF signal.

Figure 9:
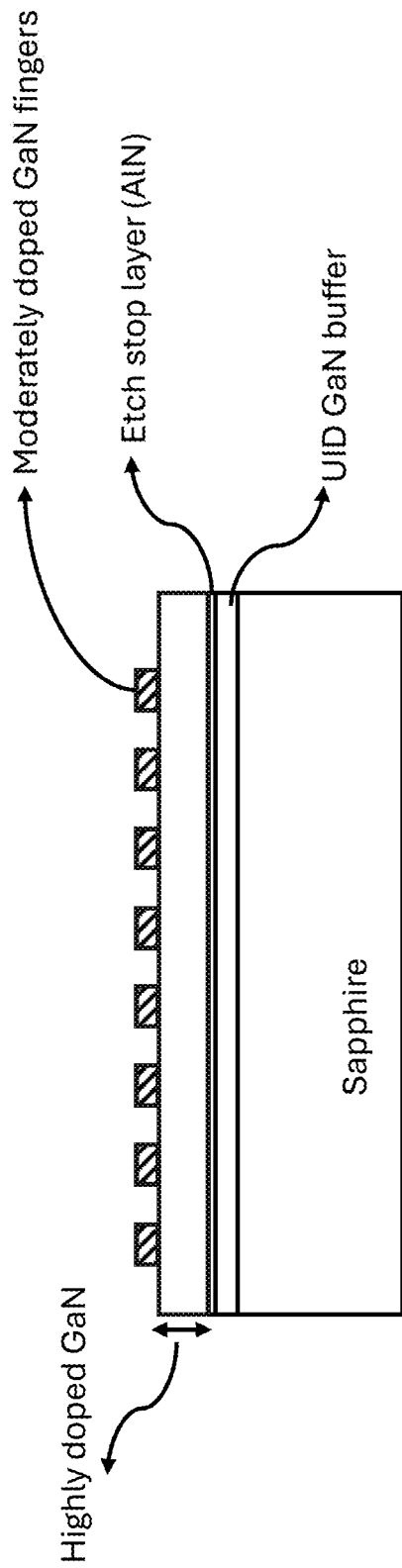
FIG. 9(a) is a simplified illustration that shows a schematic representation of the fabrication of a porous/void-containing layer in the middle of DBR layers, called DBR stack-1 and DBR stack-2: (a) Sapphire substrate containing a UID (unintentionally doped) buffer GaN, an etch stop layer (AlN) aluminum nitride, a highly doped semiconductor layer, and a moderately doped semiconductor layer with etched trenches (IDT fingers) for the uniform spread of SAW/BAW, (b) highly doped semiconductor layer is to be subject to porosification (porosified) with the help of the IDT layout and the first set of DBR stack is deposited, (c) laser liftoff and chemical etching, (d) the second set of DBR stack is deposited, (e) GaN and AlN layers on SIC (silicon carbide) substrate with fabricated IDT layout, (f) first stack of DBR layers deposited after porosification, (g) removing SIC substrate, (h) deposited second DBR stack in an example of the present invention.
Figure 9:
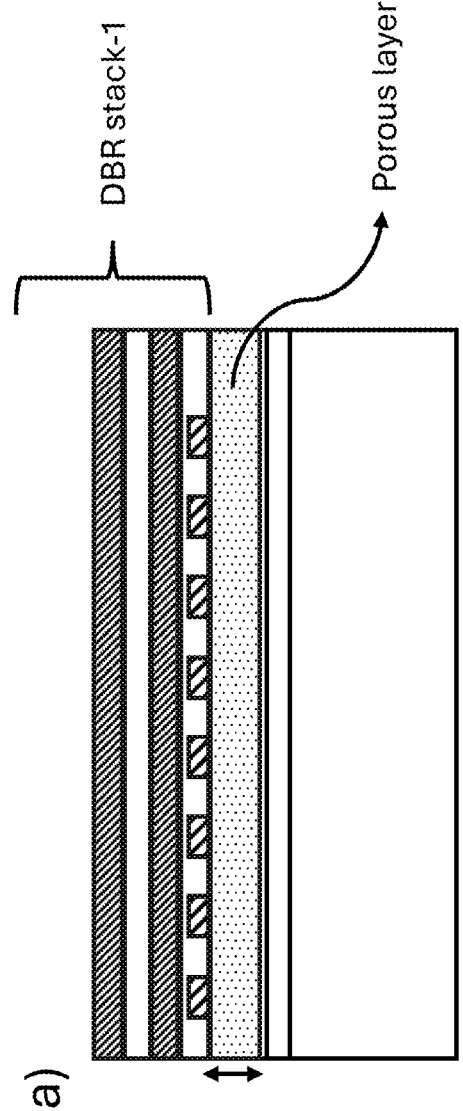
Figure 10:
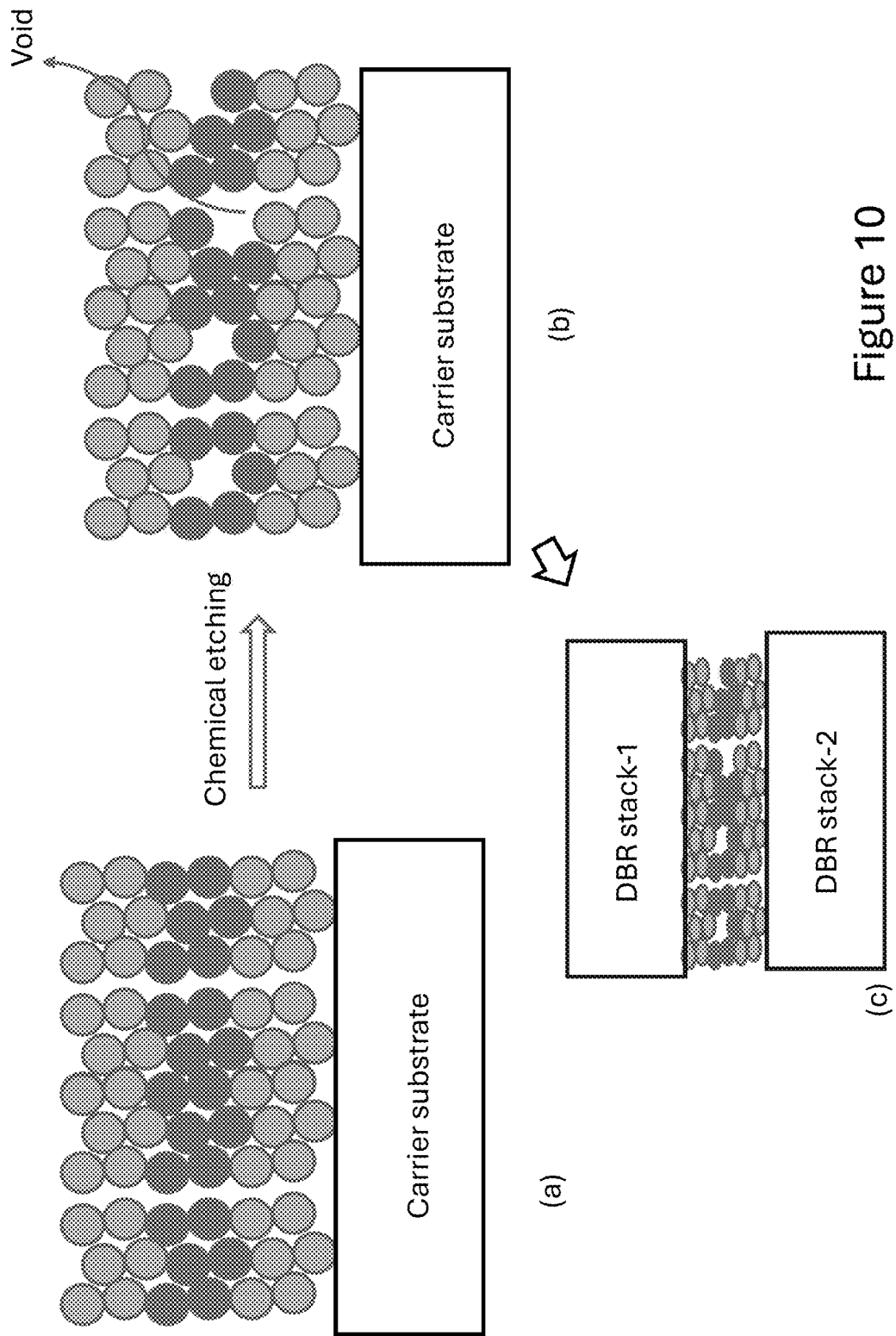
FIG. 10 is a simplified illustration that shows a schematic to depict the porosification or void-forming method: (a) alternative layers of piezo material and metal composite layer, (b) metal sites are selectively etched using chemicals, leaving voids in the compound piezoelectric layer, (c) two DBR stacks are deposited on top and bottom of the void-containing layer in an example of the present invention.

FIGS. 9 and 10 illustrate possible procedures to obtain a sandwich of voids/pores-containing piezoelectric crystal layers in the middle of a DBR stack in an example. One process relies on electrochemical etching, and the other procedure relies on selective chemical etching of composite metal atoms. In both procedures, the thickness of the void/pore-containing layer is controlled to a quarter wavelength or to the required thickness.

Figure 11:
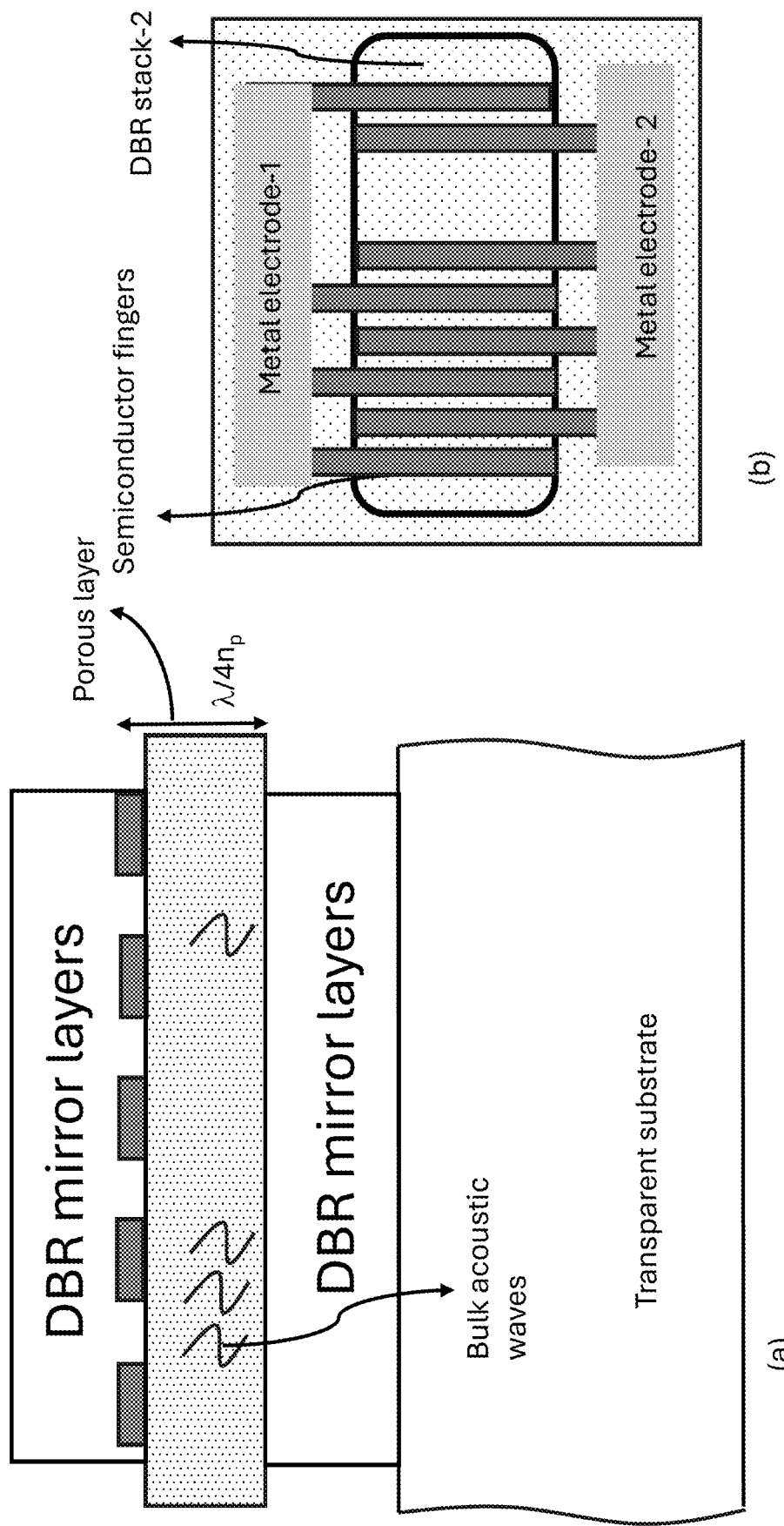
FIG. 11 is a simplified version for (a) electrical contacts and porosification, where, unlike other structures, the DBR layers can be dielectric or semiconductor type, but the center porosified layer is a piezoelectric semiconductor layer matched with the refractive index of the DBR layer at that place, and an (b) IDT layout on the porosified layer, where electrical contact pads are metal and fingers are semiconductor layers or a transparent conducting layer like ITO in an example of the present invention.

FIG. 11 represents a schematic of (a) a sandwich structure with a pores/voids-containing layer that has a thickness of a quarter wavelength and a refractive index np, matching one of the DBR mirror layers in an example. If one of the DBR stacks is made of dielectric materials, the porosity can be adjusted to precisely match the refractive index of the layer in the DBR stack.

On top of the piezoelectric porous layer, a thin doped semiconductor layer is added, ensuring that the combined thickness of the porous and doped layers does not exceed a quarter wavelength. This doped layer is formed into an IDT layout; alternatively, a transparent conducting oxide layer such as ITO can be used to form the IDTs. Metal pads are deposited at the ends of the IDT fingers for better conductivity. FIG. 11, see reference (b), shows the top surface of the porous piezoelectric layer with IDTs. The first stack of DBRs is placed within the rectangular solid line, ensuring that the high-power laser is incident only in the region away from the metal pads.

Figure 12:
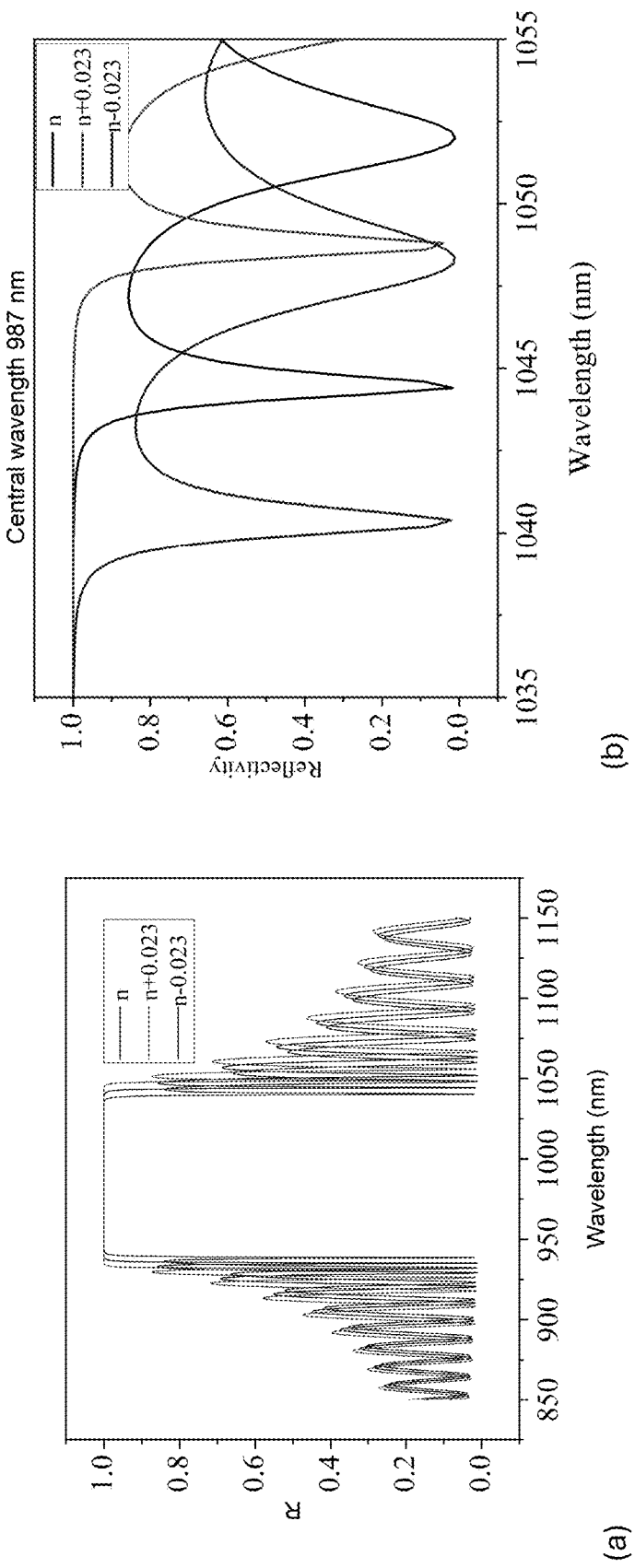
FIG. 12 is a simplified illustration of reflection spectrum of a GaN/void-containing GaN layer stack of DBRs totaling, e.g., 55 pairs, where the central wavelength is adjusted to, e.g., 987 nm, so that the 1040 nm wavelength stays at the end of the stop band, and two more traces when the refractive index of the pores/voids-containing layer changes to, e.g., 0.023, from the reference layer, (b) magnified version at the end of the stop band, where the induced refractive index contrast in the void-containing layer shifts the reflectivity spectrum in an example of the present invention.

FIG. 12, see reference (a), presents a simulation result for a DBR stack containing GaN and porous GaN layers, similar to the structure shown in FIG. 8, see reference (b), in an example. The reflectivity spectrum of the structure for GaN/porous GaN layers with thicknesses of 105 nm and 145.2 nm, respectively, is examined. The refractive index of the porous GaN layer is 1.6994 for a porosity of 40%. The simulation employs a total of 55 periods, targeting a central wavelength of 987 nm. The reflectivity spectrum's stop band edge includes the 1040 nm wavelength, which can be reduced in reflectivity by altering the refractive index from 1.6994 to 1.6761, thus achieving a refractive index contrast of 0.023. FIG. 12(b) provides a magnified view of the traces at one end, indicating a spectrum shift when the refractive index is altered. The acoustic wave in the piezoelectric material can induce the necessary contrast in the porous layer.

Figure 13:
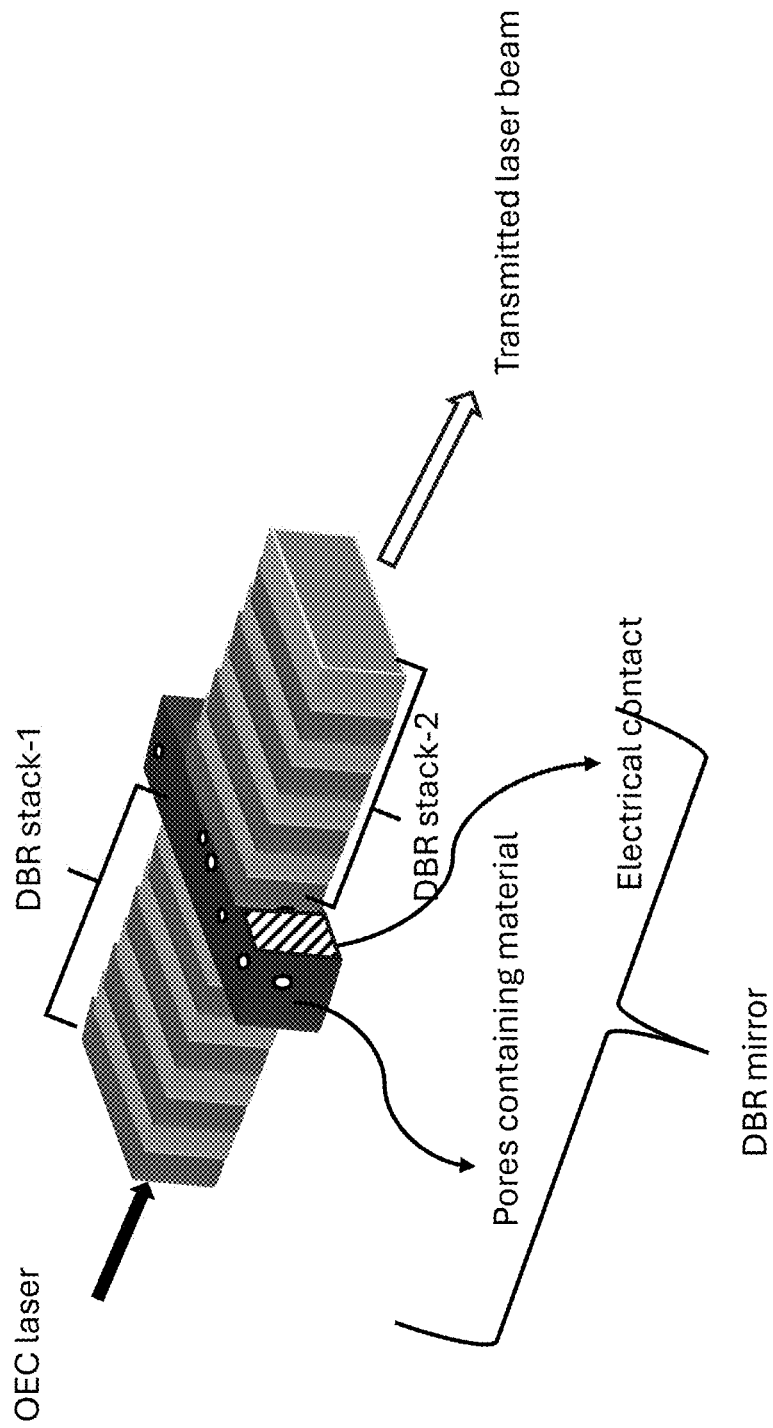
FIG. 13 is a simplified illustration that shows a DBR cavity structure, where the voids/pores containing layer thickness is half a wavelength thick of one of the DBR stack layers in an example of the present invention.
Figure 14:
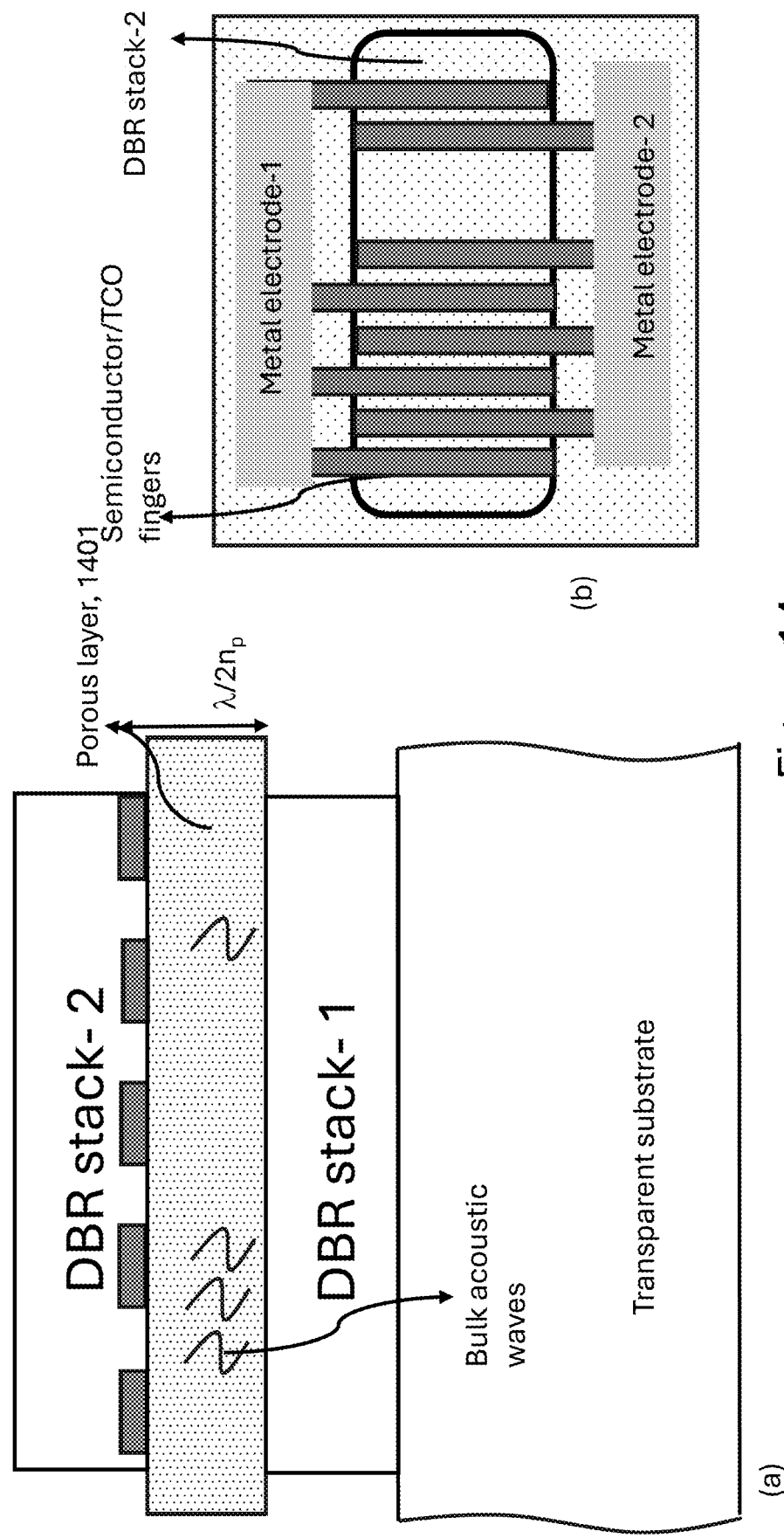
FIG. 14 is a simplified illustration that shows (a) a DBR cavity structure with an IDT layout sandwiched between the upper and lower DBR stacks, and (b) an IDT layout structure with metal electrodes and semiconductor/TCO fingers in an example of the present invention.

FIG. 13 presents a proposed DBR cavity structure in one of the examples, where the cavity layer thickness is modified to be half a wavelength thick instead of the conventional quarter wavelength in an example. On either side of this cavity layer, two DBR mirror stacks are placed. The combined structure exhibits a cavity resonance, or a dip, in the reflectivity spectrum. This dip can be modified by changing the refractive index of the cavity layer. Two DBR stack layers are placed on the top and bottom of the pore-containing layer, introducing a cavity resonance dip in the reflective spectrum of the DBR cavity. The dip can be manipulated by applying acoustic waves to the pores/voids-containing layer. The structure's cross-section is shown in FIG. 14, see reference (a), and FIG. 14, see reference (b), illustrates the IDT layout structure formed on the slightly doped semiconductor layer. Alternatively, a thin transparent conductive layer can be separately placed and later formed into an IDT shape, which will also be effective.

Figure 15:
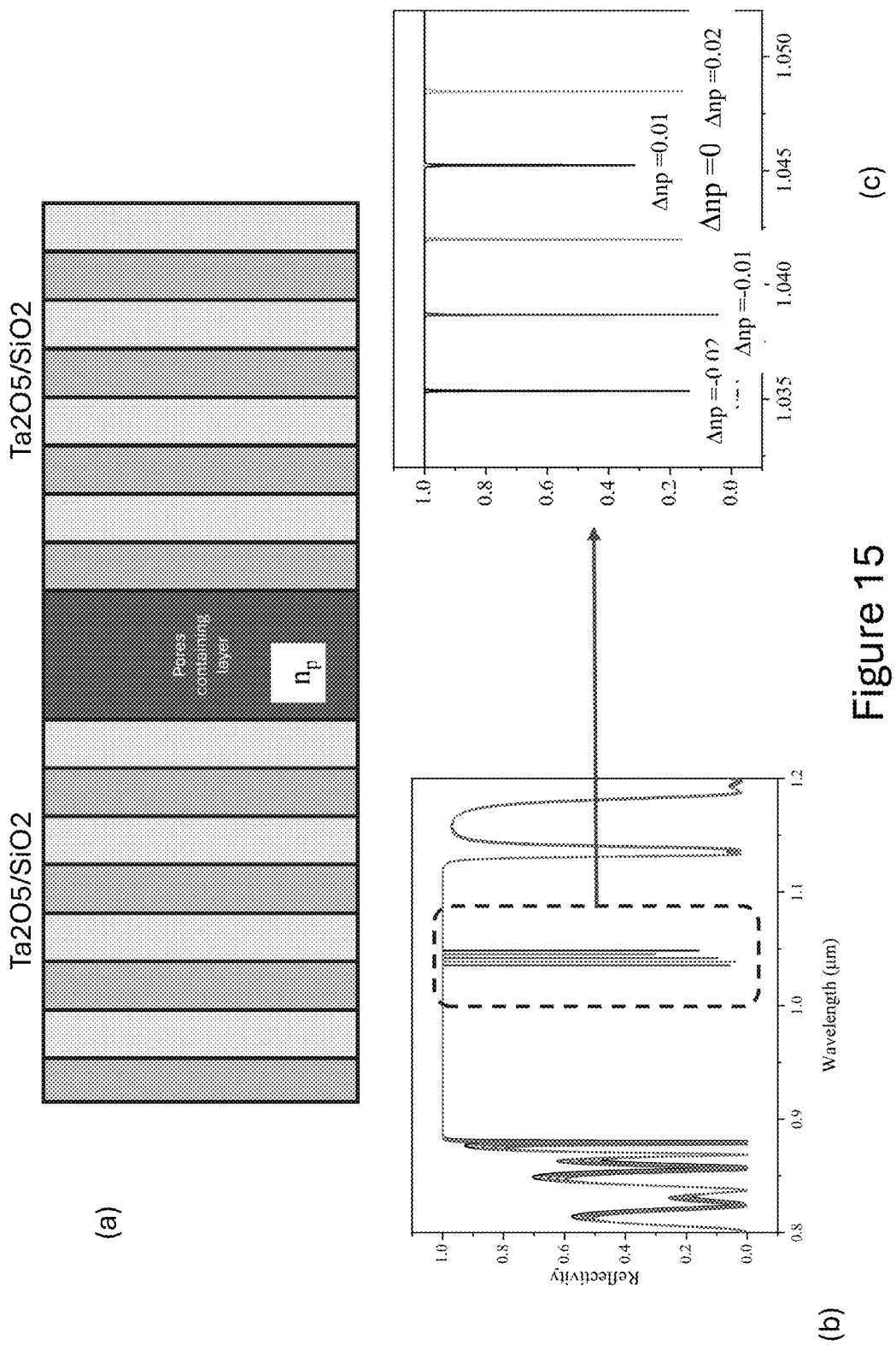
FIG. 15 is a simplified illustration of (a) schematic of $Ta^2O^5/SiO_2$ layers of DBR stacks on either side of pore/voids containing piezoelectric layer, with an effective refractive index np, (b) reflectivity spectrum plot of the cavity DBR structure with several traces representing a refractive index, np, spanning between, e.g., 1.24 to 1.28, (c) a magnified version to observe the dip in the reflection spectrum of the system for the spanned refractive indices, indicating a change Δnp between ±0.02 in an example of the present invention.

FIG. 15 presents simulation results for a DBR cavity structure composed of Ta2O5/SiO2 layer stacks in an example. The cavity layer is porous with a refractive index, np and has a thickness of half a wavelength. FIG. 15(b) shows the reflectivity spectrum of the DBR cavity structure due to the introduced cavity layer. FIG. 15(c) provides a magnified view of the reflectivity spectrum, highlighting the traces when the refractive index of the cavity layer is varied by 0.02 from its original value. By introducing a refractive index change through acoustic wave coupling to the pores/voids-containing piezoelectric layer, the dip in the reflectivity spectrum can be dynamically adjusted, effectively creating transparency at the dip wavelength.

Again, referring to the drawings, the voids/pores piezoelectric crystal layer in FIGS. 4 and 5 of the present invention is described below as an example. In one example, enhancements in laser peak power intensity due to pulse stacking inside the optical enhancement cavity (OEC) are estimated to reach 100,000 times following 100,000 round trips between two distributed Bragg reflector (DBR) mirrors. Consequently, the laser in the OEC is projected to yield a peak power in the terawatt (TW) or the petawatt (PW) class. A schematic of the OEC with two DBR mirrors is presented in FIG. 1.

In an example, porosifying (e.g., making porous) a thin piezoelectric layer reduces its refractive index, which can s enhance the performance of optoelectronic devices, sensors, and acoustic devices. Porosification involves creating a porous structure within the material to modify its optical, electrical, and mechanical properties. Several methods achieve porosification, including electrochemical etching, ion implantation followed by thermal annealing, and metal-assisted chemical etching (MACE).

Electrochemical etching is provided for porosification, especially in semiconductors like silicon, GaAs, and GaN (Gallium Nitride). In this method, an electric current is applied to the semiconductor submerged in an electrolyte solution. The current causes the dissolution of the semiconductor material, forming pores whose size and distribution can be controlled by adjusting the etching parameters such as voltage, current density, and etching time. For example, porous silicon can be created with pore sizes ranging from a few nanometers to several micrometers, depending on the electrochemical conditions. This method allows precise control over the porosity, making it suitable for various applications.

Ion implantation followed by thermal annealing is another technique used for creating porous structures in semiconductors and piezoelectric materials. In this process, high-energy ions are implanted into the semiconductor substrate, causing damage and creating defects. Subsequent thermal annealing induces the formation of pores as the material recrystallizes. This method is particularly effective for materials like GaAs (Gallium Arsenide) and ZnO (Zinc Oxide). For instance, ion implantation in GaAs followed by annealing can produce nanoporous structures that significantly enhance the material's optical properties.

Metal-assisted chemical etching (MACE) is a technique that uses a metal catalyst to facilitate the etching process, leading to the formation of porous structures, as shown in FIG. 11. In this method, a thin layer of metal, such as silver or gold, is deposited on the semiconductor surface. The metal catalyzes the etching reaction when exposed to an etchant solution, such as a mixture of hydrofluoric acid and hydrogen peroxide, resulting in the formation of porous structures. This method is particularly effective for creating high-aspect-ratio pores in materials like silicon.

Porosification in GaN (Gallium Nitride) involves several specific steps to create the desired porous structure, which can significantly enhance its optical and piezoelectric properties. GaN can be either doped or undoped, and the choice affects the porosification process and the resulting properties of the material. For doped GaN, specific impurities are introduced to modify its electrical and optical properties. For example, n-type doping can be achieved using silicon (Si) or germanium (Ge). Typical doping concentrations range from $10^{18}$ to $10^{19}$ cm$^{-3}$ for n-type.

Electrochemical etching of GaN involves cleaning and preparing the GaN layer, whether doped or undoped, by depositing a metal contact, usually gold or platinum, on the surface to facilitate electrical connection. The prepared GaN sample is submerged in an electrolyte solution, commonly a mixture of hydrofluoric acid, ethanol, KOH, etc. An electric current is applied between the GaN and a counter electrode in the electrolyte solution. The current density and voltage are carefully controlled to achieve the desired porosity. Higher current densities typically result in larger pores, with porosity levels ranging from 10% to 75%. Ion implantation in GaN followed by thermal annealing involves implanting high-energy ions, such as argon or nitrogen, into the GaN substrate. This process creates defects and damage within the crystal structure. The implanted GaN is then subjected to high temperatures in a controlled environment, typically around 800-1000° C. in a nitrogen or argon atmosphere. This step allows the material to recrystallize and form nanopores.

In an example, porosified GaN or GaAs can be used to create high-efficiency surface acoustic wave (SAW) devices. By introducing pores, the refractive index of GaN or GaAs can be dynamically modulated. For instance, porosified GaN can achieve a refractive index contrast between 0.1 and 0.95 as the porosity increases from 10% to 75%. Even a 1% change in porosity can lead to a 0.01 index contrast, which is significant for applications requiring precise control of optical properties.

FIG. 4(a) illustrates surface acoustic wave (SAW) surface undulations on a piezoelectric layer, 401. The undulations have a common reference point for maximum and minimum amplitude, resulting in no net change in the surface. This undulation amplitude varies with different crystalline orientations of the piezoelectric material used. FIG. 4(b) shows a single void/pore, 402, when influenced by an acoustic wave. As the void is random in shape, the inner surface combines various crystal orientations, resulting in some orientations favoring increased amplitude and others not, leading to a net volume change in a single pore. When this phenomenon is amplified in several pores/voids in the layer, the layer as a whole exhibits a refractive index contrast when acoustic waves are applied. Acoustic waves have an amplitude on the order of a few picometers, and pores have internal diameters roughly 5 to 15 nm. Thus, for an amplitude of 250 μm from a mere 10 nm void, this induces nearly ~15% porosity. Even a 1% change induces a refractive index contrast of 0.01, which is nearly impossible to achieve with applied acoustic waves in bulk piezoelectric layers. Bulk piezoelectric layers typically show a refractive index contrast change on the order of 0.0001-0.0003. Therefore, our invention of introducing acoustic waves in pores-containing piezoelectric layers advances many applications in the optical field. One of them is laser fusion applications, where high-energy laser beams must be extracted from the cavity. By changing the refractive index two order higher than that of conventional method, there would be many applications in the field of electro-optical devices.

Referring to the drawings in FIGS. 9 and 14 of the present invention, the sandwiching method of a porous/voids-containing piezoelectric layer is described below as an example. This method involves integrating a porous piezoelectric layer between two distributed Bragg reflector (DBR) stacks, forming a highly efficient optical and acoustic modulation system.

As illustrated in FIG. 9, either a quarter-wavelength thin porous piezoelectric layer or a half-wavelength thick porous/void-containing piezoelectric crystal layer is sandwiched between two DBR stacks. The DBR stacks can be composed of alternating layers of semiconductor alloys or materials from the dielectric family. The piezoelectric crystal layer can be patterned using a thin doping layer of the respective piezoelectric material or by depositing a thin transparent conductive oxide (TCO) material, which is then patterned into interdigital transducer (IDT) fingers before attaching the first stack of DBR mirror layers. Typically, metals such as gold or platinum are used to spread the RF field uniformly. However, since laser energy will be absorbed when metals are used, only the outer region of the fingers is made metallic so that the incident laser does not interact with the metal part of the modified DBR mirror system.

The preparation of the nanoporous sandwich between two DBR stacks is detailed here. In the first example, a sapphire substrate is used, onto which a buffer GaN layer and an etch-stopping layer such as AlN are deposited, followed by highly doped GaN and moderately doped GaN layers. The total thickness of the doped GaN layers and etch stop layers is adjusted to either half or quarter wavelength of the desired reflection spectrum of the DBR stack. The porosification process begins with the formation of the finger layout etched photolithographically onto the piezoelectric material. These fingers can also serve as contact layers during the porosification process. The GaN layers, with the substrate, are embedded in a chemical solution, forming an electrical circuit between the finger layout and the chemical used. After achieving pores in the highly doped GaN layers, the first stack of DBRs is deposited. The sapphire substrate is then removed using a laser liftoff technique, and another stack of DBR mirrors is attached after a series of chemical and/or reactive ion etching procedures to expose the etch stop layer.

In another example, a porosifiable GaN layer is grown on a SiC substrate, and the porosification process is carried out, followed by the deposition of the first set of DBR stacks. The SiC substrate is removed either chemically or mechanically. Then, the next set of DBR stacks is deposited, resulting in a DBR cavity or DBR mirror system with an included porous piezoelectric layer. This method effectively creates a high-performance optical and acoustic modulation system by leveraging the desirable properties of nanoporous piezoelectric materials and the reflective efficiency of DBR mirrors. The incorporation of a nanoporous piezoelectric layer between two DBR stacks offers significant advantages in modulating light and acoustic waves. The porosity within the piezoelectric layer can dynamically alter its refractive index, enhancing the tunability of the DBR system. This dynamic modulation is desirable for applications requiring precise control of optical properties, such as in laser fusion, where high-energy laser beams must be efficiently extracted from the cavity. By integrating the porous piezoelectric layer, the system can achieve higher efficiency and better performance compared to conventional bulk piezoelectric layers, which exhibit limited refractive index contrast changes.

Referring to the drawings in FIG. 8 of the present invention, another example describes the shifting of the reflective spectrum of the DBR system by altering the refractive index of a porous/void-containing piezoelectric layer using acoustic waves. FIG. 8(a) depicts a DBR mirror system, where multiple DBR layer pairs are semiconductor layers, with at least one layer containing voids/pores. The side of the DBR stack is exposed by etching, and an electrical connection is established at the ends. By applying acoustic waves, the reflectivity spectrum of the DBR mirror system can be shifted. The acoustic waves induce a refractive index contrast of at least 0.001, which is sufficient to shift the reflective spectrum of the DBR system. As a result, a wavelength originally at the end of the stop band of the spectrum, with a reflectivity of nearly 99.999% or 99.9999%, can be reduced to 1% or less, allowing the wavelength to become transparent to the DBR system.

Similarly, FIG. 8(b) shows a DBR mirror system where one layer in each DBR pair is a porous/void-containing piezoelectric layer. Each layer can be addressed with a separate pair of electrodes to send acoustic waves through it. Similar to the above discussion, the wavelength at the end of the stop band of the DBR mirror system can become transparent when acoustic waves induce a refractive index contrast.

FIG. 8(c) illustrates a DBR mirror system where at least one of the DBR stacks can be dielectric, or both can be dielectric material systems. However, the central porous/void-containing piezoelectric layer's thickness is adjusted to match one of the DBR pairs of the system. Electrical pads formed in an IDT layout allow the application of acoustic waves to shift the wavelength of the highest reflectivity, reducing it to low reflectivity and making it transparent. FIG. 8(d) shows the traces of the reflectivity spectrum schematic when acoustic waves are applied and not applied.

Referring to the drawings in FIGS. 13, 14, and 15 of the present invention, another example describes shifting the reflective spectrum of the DBR system by altering the refractive index of a porous/void-containing piezoelectric layer using acoustic waves. FIG. 14(a) shows a cross-section of a DBR mirror cavity system, where a single piezoelectric cavity layer containing pores/voids is adjusted to a thickness of half the wavelength of the central frequency of the reflective spectrum of the DBR cavity system. The refractive index of the cavity layer can be controlled by adjusting its porosity. An IDT layout structure is formed on the cavity layer to inject acoustic waves. FIG. 14(b) details the IDT layout structure on the cavity layer. This DBR cavity system design exhibits a dip in the reflectivity spectrum. The dip wavelength can be shifted by changing the refractive index of the cavity layer through the application of acoustic waves.

FIG. 15 presents simulation results for the DBR cavity system, where two DBR stacks of $Ta_2O_5/SiO_2$ are formed on either side of the DBR cavity layer. The DBR cavity layer is a porous/void-containing piezoelectric layer. The reflectivity spectrum of the DBR cavity system is shown in FIG. 15(b), where a dip in the reflectivity spectrum can be observed. This dip can be manipulated by varying the refractive index of the cavity layer within a range of ±0.02. A magnified view of the dip manipulation is shown in the reflectivity spectrum, demonstrating that the dip wavelength with lower reflectivity can become transparent in the system. The injected OEC laser from a backside of the first high reflection mirrors is intensified up to 100,000 times after 100,000 times round trip reflections by two high reflection DBR mirrors in the OEC wherein the peak wavelength of the laser beam of 1037 nm is located at a high reflection region of 5 nm away from the reflection dip at the wavelength of 1042 nm at $\Delta np=0$ of a second high reflection DBR mirror as shown in FIG. 15(c). Then, the acoustic wave is switched on to move the reflection dip at 1042 nm of $\Delta np=0$ to the wavelength location at 1037 nm at $\Delta np=-0.013$ of the peak wavelength of the laser wherein the reflectivity for the laser becomes from 99.999% to 10% as shown in FIG. 15(c). Thus, the 100,000 times intensified laser beam is traversed through a portion of the second mirror and extracted through the second high reflection mirror effectively with a loss of less of 10%. When the cavity length of the OEC is 150 m, the round-trip time of the laser beam in the OEC is 1 microsecond. Thus, the response time of the cavity dumper wherein the reflectivity of the DBR mirror containing the piezoelectric martials with the void or pores is changed by applying the acoustic wave or the electric field should be faster than 1 microsecond. When the cavity length of the OEC is 15 m, the response time of the cavity dumper should be faster than 0.1 microsecond. When the cavity length becomes shorter, the response time of the cavity dumper should be faster.

Figure 16:
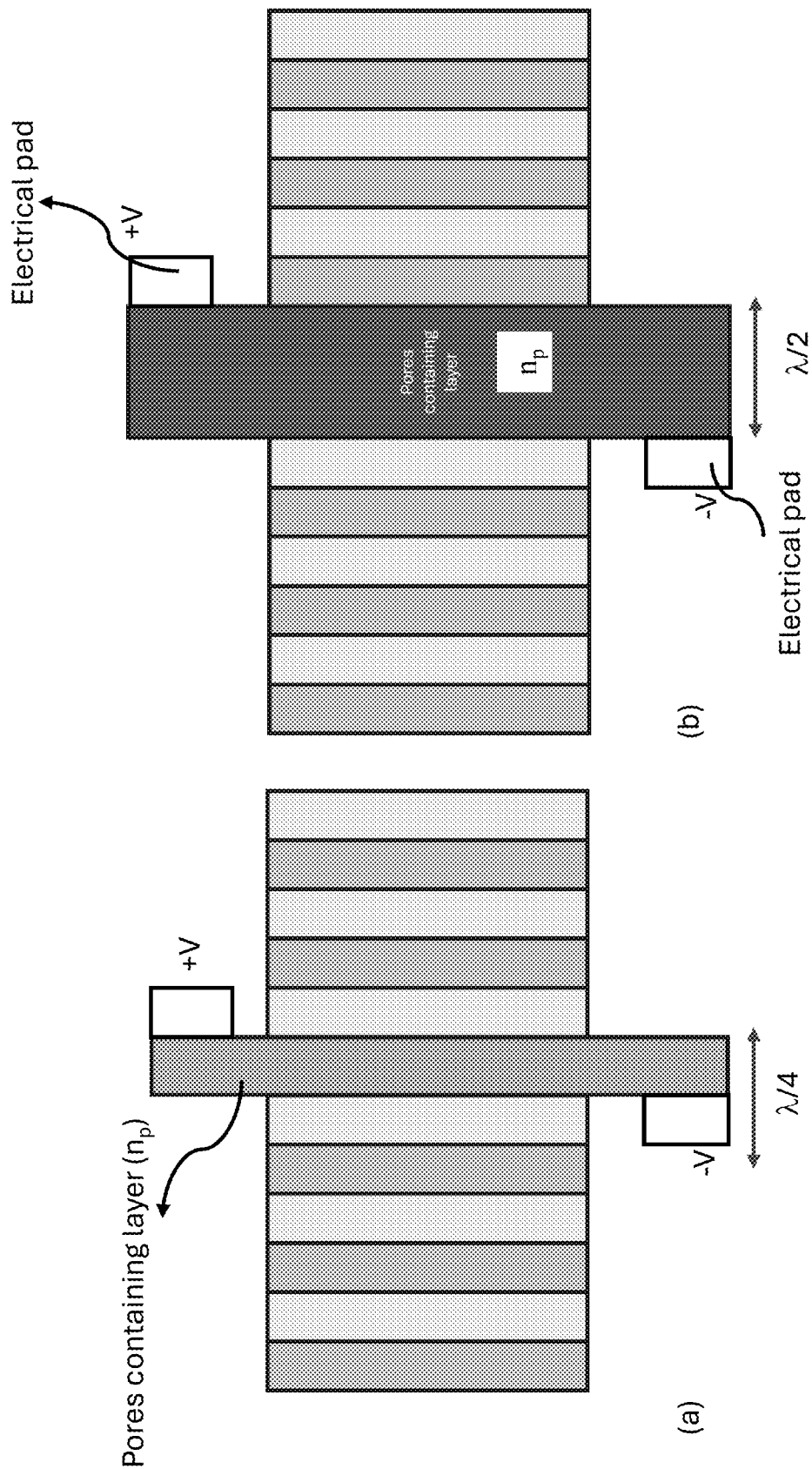
FIG. 16 are simplified examples that shows (a) a DBR and (b) a DBR cavity design, both featuring a pore-containing piezoelectric layer equipped with contacts for the application of an electric field in an example of the present invention.

Referring to FIG. 16, an electric field application to two types of Distributed Bragg Reflectors (DBRs) is shown in (a) and (b) respectively. The layer containing pores or voids is a piezoelectric material with an effective refractive index np. This layer is designed to be either a quarter or half the wavelength of the DBR's central wavelength which wavelength equal to the laser wavelength.

In the quarter wavelength design, electrical contacts are placed on the pores containing piezoelectric layer. When an electric field is applied, it changes the volume of the pores, which in turn alters the refractive index of the layer. This change in refractive index creates a contrast that affects the DBR spectrum, causing variations in the reflection spectrum.

For the half wavelength design, also known as a DBR cavity design, the central resonant peak of the spectrum exhibits a dip, indicating reduced or null reflectivity at the central wavelength. This design is particularly sensitive to changes in the electric field, which can shift the position of the dip in the spectrum. By applying an electric field to the central half wavelength pore-filled layer, the system can dynamically change the central wavelength of reflectivity, providing a tunable optical response.

This tunability is advantageous for applications requiring precise control over light reflection and transmission properties, such as in optical filters, sensors, communication devices, and extraction of laser energies for fusion experiments. The ability to modulate the refractive index and the resulting spectral properties through electric fields offers significant flexibility in the design and operation of optical components.

Figure 17:
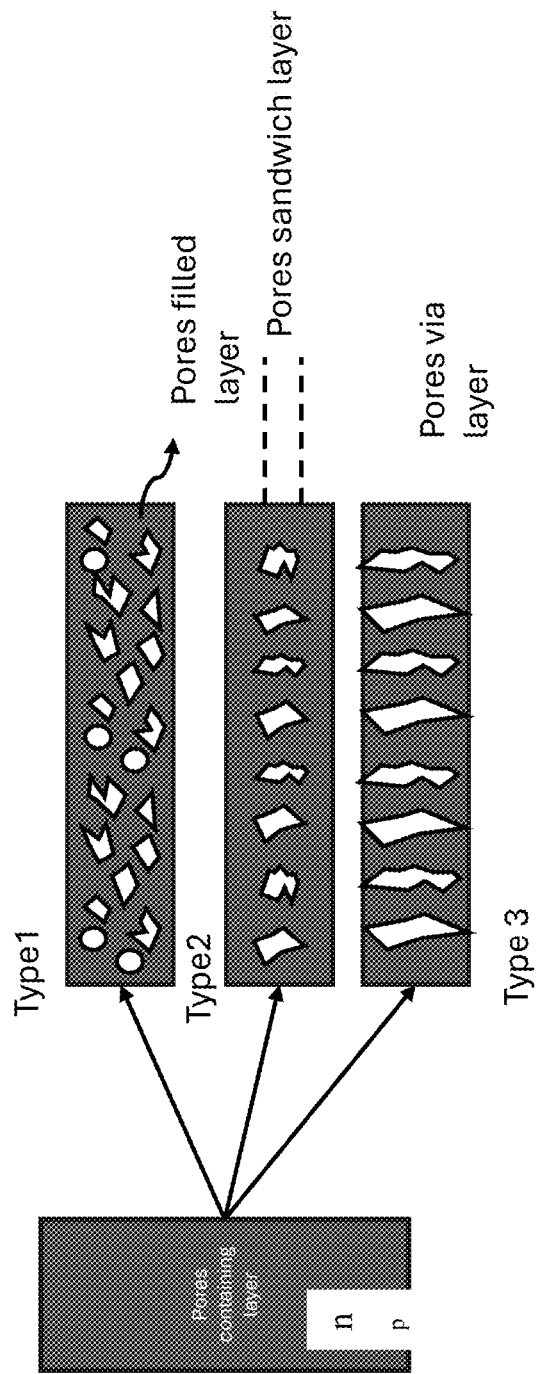
FIG. 17 illustrates various types of porous layers in an example of the present invention.

Referring to FIG. 17, the invention encompasses a porous layer example with three distinct types of pores within the piezoelectric semiconductor layer:

Type1) Three-dimensionally distributed pores or voids, providing a desirable interaction with light and acoustic waves due to their random and widespread distribution, making them suitable for dynamic modulation of optical properties.

Type2) Embedded pores or voids in the piezoelectric semiconductor layer, facilitating modulation of the refractive index to achieve the desired reflectance variability. These pores influence the mechanical strength, thermal conductivity, electrical properties, and optical characteristics of the material.

Type3) Pores or voids formed by wet or dry etching through the entire layer by using the mask, creating small uniform openings or gaps that significantly affect the material's properties. The random size or uniform size openings can be precisely controlled to enhance A Variable Reflectance Distributed Bragg Reflectors (VR-DBRs) performance. The figure shows the random size of voids. Using the mask for etching, the uniform size of voids could be fabricated in an example.

These three types of pores or voids can be realized through various etching techniques. Physical selective etching involves using physical processes like ion milling or laser ablation to selectively remove material and create pores. Selective chemical etching employs chemical etchants to selectively dissolve parts of the material, forming pores with precise sizes and distributions by adjusting parameters such as concentration, temperature, and exposure time. Electrochemical etching applies an electric current to the semiconductor submerged in an electrolyte solution, causing dissolution of the material and formation of pores. This method allows fine control over the porosity by adjusting the current density and voltage.

In one of the pore or voids fabrication techniques, silicon nano-powders with grain sizes between 5-20 nm are dispensed onto a piezoelectric semiconductor layer and subjected to selective reactive ion etching to create voids, gaps, or pores in the layer. This process is uniform and scalable to larger sizes. Dispensing nano-powder onto a semiconductor layer can be carried out through spin-coating methods for uniform spreading. The process of creating porosity in semiconductors involves several sophisticated techniques. One common method is electrochemical etching, which uses an electric current to dissolve parts of the semiconductor material, forming pores. This method allows precise control over the size and distribution of the pores by adjusting the etching parameters such as voltage, current density, and etching time. Another technique involves the use of ion implantation followed by thermal annealing, where ions are implanted into the semiconductor substrate to create damage, and subsequent annealing helps in the formation of pores. Additionally, metal-assisted chemical etching (MACE) has been employed, where a metal catalyst facilitates the etching process, leading to the formation of porous structures.

The designed porous layers can also function as photonic crystals. Photonic crystals introduce a photonic band gap, which can be dynamically tuned by applying an electric field or acoustic waves. In the described structures, the photonic crystal's effective transmission or reflection spectrum can be modulated, enabling precise control over the optical properties of the VR-DBR system. This capability is critical for applications requiring high-efficiency light manipulation, such as laser fusion, optical filtering, and advanced sensing technologies. By leveraging the desirable properties of nanoporous semiconductors and combining them with acoustic waves or electric fields, the invention aims to create highly tunable and efficient optical devices.

In an example, the present invention provides a laser system. The laser system has a source laser (e.g., CBC) coupled to first mirror device opposing a second mirror device and configured to generate a resonating laser beam between the first mirror and the second mirror. In an example, the system has a piezoelectric device configured to the second mirror device and characterized by a refractive index such that one or more voids is changed by applying an energy to the piezo electric device to cause a change in a value of the refractive index, e.g., by more than 0.0001, to allow the resonating laser beam or a portion of the resonating laser to traverse through a portion of the second mirror device.

In an example, the energy is provided using an acoustic wave or an electric field. In an example, the energy induces the refractive index change greater than in a bulk piezoelectric layer without voids. In an example, the voids comprise one or more pores, open regions, or other structures. In an example, the change in the value, e.g., is more than 0.01. In an example, the piezoelectric device is configured to extract a laser beam from a cavity between the first mirror and the second mirror. In an example, the cavity is a Fabry Perot cavity or an optical enhancement cavity (OEC).

In an example, the present invention provides a Variable Reflectance Distributed Bragg Reflector (VR-DBR) mirror device. The device has a transparent substrate, e.g., optically transparent. In an example, the device has a plurality of stacked layers of materials with at least two different refractive indices to form a distributed Bragg reflector (DBR) overlying the transparent substrate. In an example, the device has a piezoelectric layer comprising a plurality of voids configured with a single or the plurality of stacked layers such that the piezoelectric layer is configured to the DBR. In an example, the device has at least one electrical contact coupled to the piezoelectric layer containing the voids, the electrical contact characterized by a conductive material. In an example, the device has an electric energy (e.g., power) coupled to the electrical contact and configured to supply an electric field in the piezoelectric layer containing the voids to alter a refractive index of the piezoelectric layer and change a reflection spectrum of the DBR to allow a laser beam to traverse through a portion of the DBR.

In an example, at a wavelength of a laser emission of the laser beam, the DBR has an initial reflectivity, e.g., of more than 99%, that is changed to a reflectivity, e.g., of 30% and less. In an example, the electrical energy is applied on and off with a repetition rate, e.g., of 0.1 Hz~10 Hz. In an example, the device is configured with an optical enhancement cavity characterized by a laser peak wavelength ranging from 1020 nm to 1070 nm. In an example, the laser beam that traverses through the DBR is configured a laser nuclear fusion including a laser induced magnetized inertial fusion (MagLIF). In an example, the device is configured to form a Fabry-Perot cavity.

In an example, the voids are formed with one or more arbitrary shapes and one or more volume contractions involving uneven modulations created inside the voids. In an example, the voids are pores. In an example, the electrical contact is configured for a side injection or a cross-coupling configuration. In an example, the DBR includes a reflectivity spectrum that is modified by shifting the reflectivity spectrum near an edge of a reflectivity stop band from a high reflectivity of more than 99% to a low reflectivity, e.g., of less than 30%, by shifting the wavelength, e.g., of 2 nm to 20 nm, at a wavelength of a laser emission. In an example, the piezoelectric layer comprises a plurality of interdigital transducers (IDTs) formed on the piezoelectric layer, each of the plurality of IDTs characterized by a plurality of comb-like structures comprising a conductive material and coupled to an RF signal to generate one or more acoustic waves. In an example, the electrical contact of the IDTs is formed on a doped piezoelectric material or a transparent conducting oxide (TCO) material deposited on piezoelectric layer. In an example, the stacked layers include a dielectric material selected from the group consisting of silicon dioxide (SiO$_2$), titanium dioxide (TiO$_2$), tantalum oxide (Ta$_2$O$_5$), and hafnium oxide (HfO$_2$). In an example, the stacked layers include a semiconductor material selected from the group consisting of gallium arsenide (GaAs) and an alloy of gallium, aluminum, and arsenic (Al$_x$Ga$_{1-x}$As) (1≥x>0). In an example, the stacked layers include a semiconductor material comprising voids and is selected from the group consisting of gallium arsenide (GaAs) and an alloy of gallium, aluminum, and arsenic (Al$_x$Ga$_{1-x}$As) (1≥x>0). In an example, the stacked layers include a semiconductor material comprising voids and comprises a gallium nitride (GaN). In an example, the DBR is composed of multi-layer pairs of a dielectric material group or a semiconductor layer group.

In an example, the piezoelectric layer is a single piezoelectric layer comprising voids sandwiched between a pair of DBRs. In an example, the piezoelectric layer is characterized by a thickness of a single piezoelectric layer and such thickness is between a quarter wavelength ($\lambda/4n$) and a half wavelength ($\lambda/2n$), where $\lambda$ is the laser emission peak wavelength and n is a refractive index of the piezoelectric layer. In an example, the piezoelectric layer is one of a plurality of layers in a DBR pair with a quarter wavelength thickness of ($\lambda/4n$), where $\lambda$ is a laser emission peak wavelength and n is a refractive index of the piezoelectric layer. In an example, the voids in a piezoelectric layer are characterized by one or more arbitrary shapes with an inner surface being a combination of more than one crystalline plane. In an example, the voids of the piezoelectric layer reduce a refractive index of one or more bulk piezoelectric materials such that the electric energy causes a response of the voids to induce a refractive index change, e.g., between 0.0001 to 0.05. In an example, the refractive index change is, e.g., greater than 0.0001. In an example, the piezoelectric layer is selected from the group consisting of, e.g., lithium niobate (LiNbO$_3$), lithium tantalate (LiTaO$_3$), quartz (SiO$_2$), zinc oxide (ZnO), aluminum nitride (AlN), GaAs, and gallium nitride (GaN), among others.

In an example, the device is characterized by a resonant reflectivity (less than 30%) dip within a high reflectivity region of more than 99% at a wavelength of the laser emission where the resonant reflectivity dip is caused by the electrical energy generating one or more acoustic waves or an electric field.

In an example, the voids in the piezoelectric layer are formed using electrochemical etching. In an example, the piezoelectric layer is formed by epitaxially growing one or more piezoelectric materials on a substrate selected from at least, e.g., a GaN, a sapphire, a SiC, and a ZnO, and others. In an example, the voids in a piezoelectric layer are formed using one or more of electrochemical etching such that an electric current is applied to a semiconductor submerged in an electrolyte solution causing dissolution of a portion of the semiconductor material forming voids, ion implantation followed by a thermal annealing, where one or more high-energy ions are implanted into a semiconductor substrate to create a damaged region, and a subsequent annealing causes formation of voids, and a metal-assisted chemical etching (MACE), where a metal catalyst facilitates an etching process causing formation of one or more voids.

In an example, the wavelength of an electric field or an acoustic wave is about equal to ($\lambda/n$) of a laser emission peak wavelength where $\lambda$ is the laser emission peak wavelength and n is a refractive index of the piezoelectric layer. In an example, the frequency of an electric field or an acoustic wave is, e.g., from 1 MHz to 100 GHz.

In an example, the present invention provides use of the term "pores" and/or "voids". Such terms are intended to have an interpretation of ordinary meaning and may be subject to one or more descriptions in one or more examples.

REFERENCES

[1] Towards Ultimate High-Power scaling: Coherent Beam Combining of Fiber Lasers, Photonics, 8(21), 566 (2021)

[2]. High-quality electron beams from a laser wakefield accelerator using plasma-channel guiding, Nature 431, 538 (2004).

[3]. The x-ray emission effectiveness of plasma mirrors: Reexamining power-law scaling for relativistic high-order harmonic generation, Sci. Rep. 10, 5154 (2020).

[4]. Investigation and optimization of N-polar porosification for regrowth of smooth hillocks-free GaN films, Appl. Phys. Lett, 119, 042105(2021)

[5] Nanoporous SiO$_2$ thin films made by atomic layer deposition and atomic etching, Nanotechnology, 27, 255603, (2016).

In an example, additional details of an optical enhancement cavity using the Fabry Perot cavity is found in a patent application titled "A FAST IGNITION FUSION SYSTEM AND METHOD," in the names of Shuji Nakamura and Hiroaki Ohta listed under U.S. Ser. No. 18/319,368 filed May 17, 2023, commonly assigned, and hereby incorporated by reference in their entirety.

While the above is a full description of the specific examples, various modifications, alternative constructions, and equivalents may be used. As an example, the present system, method, and device can include any combination of elements described above, as well as outside of the present specification. In an example, the high intensity laser forms a resonator between the pair of mirror devices using constructive interference of each of the laser beams. In an example, the first path with the high intensity pulse laser is provided in a resonator device. In an example, the present invention provides a system and method to generate a concentric or spherical resonator within a reaction region to focus laser light at a center of the reactor. Additionally, the terms first, second, third, and final do not imply order in one or more of the present examples. Therefore, the above description and illustrations should not be taken as limiting the scope of the present invention which is defined by the appended claims.

The invention claimed is:

1. A Variable Reflectance Distributed Bragg Reflector (VR-DBR) mirror device comprising:
   a transparent substrate;
   a plurality of stacked layers of materials with at least two different refractive indices to form a distributed Bragg reflector (DBR) overlying the transparent substrate:
      a piezoelectric layer comprising a plurality of voids configured with a single or the plurality of stacked layers such that the piezoelectric layer is configured to the DBR;
      at least one electrical contact coupled to the piezoelectric layer containing the voids, the electrical contact characterized by a conductive material; and
      a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;

wherein at a wavelength of a laser emission of the laser beam, the DBR has an initial reflectivity of more than 99% that is changed to a reflectivity of 30% and less.

2. The device of claim 1 wherein the electrical energy is applied on and off with a repetition rate of 0.1 Hz~10 Hz.

3. The device of claim 1 wherein the laser beam that traverses through the DBR is configured a laser nuclear fusion including a laser induced magnetized inertial fusion (MagLIF).

4. The device of claim 1 wherein the device is configured to form a Fabry-Perot cavity.

5. The device of claim 1 wherein the voids are formed with one or more arbitrary shapes and one or more volume contractions involving uneven modulations created inside the voids.

6. The device of claim 1 wherein the voids are pores.

7. The device of claim 1, wherein the electrical contact is configured for a side injection or a cross-coupling configuration.

8. The device of claim 1, wherein the piezoelectric layer is characterized by a thickness of a single piezoelectric layer and such thickness is between a quarter wavelength ($\lambda/4n$) and a half wavelength ($\lambda/2n$), where $\lambda$ is the laser emission peak wavelength and n is a refractive index of the piezoelectric layer.

9. The device of claim 1, wherein the piezoelectric layer is one of a plurality of layers in a DBR pair with a quarter wavelength thickness of ($\lambda/4n$), where $\lambda$ is a laser emission peak wavelength and n is a refractive index of the piezoelectric layer.

10. The device of claim 1, wherein the refractive index change is greater than 0.0001.

11. A Variable Reflectance Distributed Bragg Reflector (VR-DBR) mirror device comprising:
a transparent substrate;
a plurality of stacked layers of materials with at least two different refractive indices to form a distributed Bragg reflector (DBR) overlying the transparent substrate:
a piezoelectric layer comprising a plurality of voids configured with a single or the plurality of stacked layers such that the piezoelectric layer is configured to the DBR;
at least one electrical contact coupled to the piezoelectric layer containing the voids, the electrical contact characterized by a conductive material; and
a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
wherein the piezoelectric layer is selected from the group consisting of lithium niobate (LiNbO$_3$), lithium tantalate (LiTaO$_3$), quartz (SiO$_2$), zinc oxide (ZnO), aluminum nitride (AlN), GaAs, and gallium nitride (GaN).

12. The device of claim 1, wherein the device is characterized by a resonant reflectivity dip within a high reflectivity region of more than 99% at a wavelength of the laser emission where the resonant reflectivity dip is caused by the electrical energy generating one or more acoustic waves or an electric field.

13. The device of claim 1, wherein the voids in the piezoelectric layer are formed using electrochemical etching.

14. The device of claim 1, wherein the piezoelectric layer is formed by epitaxially growing one or more piezoelectric materials on a substrate selected from a group consisting of a GaN substrate, a sapphire substrate, a SiC substrate, and a ZnO substrate.

15. The device of claim 1, wherein the voids in a piezoelectric layer are formed using one or more of electrochemical etching such that an electric current is applied to a semiconductor submerged in an electrolyte solution causing dissolution of a portion of the semiconductor material forming voids, ion implantation followed by a thermal annealing, where one or more high-energy ions are implanted into a semiconductor substrate to create a damaged region, and a subsequent annealing causes formation of voids, and a metal-assisted chemical etching (MACE), where a metal catalyst facilitates an etching process causing formation of one or more voids.

16. A Variable Reflectance Distributed Bragg Reflector (VR-DBR) mirror device comprising:
a transparent substrate;
a plurality of stacked layers of materials with at least two different refractive indices to form a distributed Bragg reflector (DBR) overlying the transparent substrate:
a piezoelectric layer comprising a plurality of voids configured with a single or the plurality of stacked layers such that the piezoelectric layer is configured to the DBR;
at least one electrical contact coupled to the piezoelectric layer containing the voids, the electrical contact characterized by a conductive material; and
a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
wherein the DBR includes a reflectivity spectrum that is modified by shifting the reflectivity spectrum near an edge of a reflectivity stop band from a high reflectivity of more than 99% to a low reflectivity of less than 30% by shifting the wavelength of 2 nm to 20 nm at a wavelength of a laser emission.

17. A Variable Reflectance Distributed Bragg Reflector (VR-DBR) mirror device comprising:
a transparent substrate;
a plurality of stacked layers of materials with at least two different refractive indices to form a distributed Bragg reflector (DBR) overlying the transparent substrate:
a piezoelectric layer comprising a plurality of voids configured with a single or the plurality of stacked layers such that the piezoelectric layer is configured to the DBR;
at least one electrical contact coupled to the piezoelectric layer containing the voids, the electrical contact characterized by a conductive material; and
a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
wherein the piezoelectric layer comprises a plurality of interdigital transducers (IDTs) formed on the piezoelectric layer, each of the plurality of IDTs characterized by a plurality of comb-like structures comprising a conductive material and coupled to an RF signal to generate one or more acoustic waves.

18. The device of claim 17, wherein the electrical contact of the IDTs is formed on a doped piezoelectric material or a transparent conducting oxide (TCO) material deposited on piezoelectric layer.

19. A Variable Reflectance Distributed Bragg Reflector (VR-DBR) mirror device comprising:
- a transparent substrate;
- a plurality of stacked layers of materials with at least two different refractive indices to form a distributed Bragg reflector (DBR) overlying the transparent substrate:
  - a piezoelectric layer comprising a plurality of voids configured with a single or the plurality of stacked layers such that the piezoelectric layer is configured to the DBR;
  - at least one electrical contact coupled to the piezoelectric layer containing the voids, the electrical contact characterized by a conductive material; and
  - a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
- wherein the stacked layers include a dielectric material selected from the group consisting of silicon dioxide ($SiO_2$), titanium dioxide ($TiO_2$), tantalum oxide ($Ta_2O_5$), and hafnium oxide ($HfO_2$).

20. A Variable Reflectance Distributed Bragg Reflector (VR-DBR) mirror device comprising:
- a transparent substrate;
- a plurality of stacked layers of materials with at least two different refractive indices to form a distributed Bragg reflector (DBR) overlying the transparent substrate:
  - a piezoelectric layer comprising a plurality of voids configured with a single or the plurality of stacked layers such that the piezoelectric layer is configured to the DBR;
  - at least one electrical contact coupled to the piezoelectric layer containing the voids, the electrical contact characterized by a conductive material; and
  - a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
- wherein the stacked layers include a semiconductor material selected from the group consisting of gallium arsenide (GaAs) and an alloy of gallium, aluminum, and arsenic ($Al_xGa_{1-x}As$) ($1 \geq x > 0$).

21. A Variable Reflectance Distributed Bragg Reflector (VR-DBR) mirror device comprising:
- a transparent substrate;
- a plurality of stacked layers of materials with at least two different refractive indices to form a distributed Bragg reflector (DBR) overlying the transparent substrate:
  - a piezoelectric layer comprising a plurality of voids configured with a single or the plurality of stacked layers such that the piezoelectric layer is configured to the DBR;
  - at least one electrical contact coupled to the piezoelectric layer containing the voids, the electrical contact characterized by a conductive material; and
  - a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
- wherein the stacked layers include a semiconductor material comprising voids and is selected from the group consisting of gallium arsenide (GaAs) and an alloy of gallium, aluminum, and arsenic ($Al_xGa_{1-x}As$) ($1 \geq x > 0$).

22. A Variable Reflectance Distributed Bragg Reflector (VR-DBR) mirror device comprising:
- a transparent substrate;
- a plurality of stacked layers of materials with at least two different refractive indices to form a distributed Bragg reflector (DBR) overlying the transparent substrate:
  - a piezoelectric layer comprising a plurality of voids configured with a single or the plurality of stacked layers such that the piezoelectric layer is configured to the DBR;
  - at least one electrical contact coupled to the piezoelectric layer containing the voids, the electrical contact characterized by a conductive material; and
  - a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
- wherein the stacked layers include a semiconductor material comprising voids and comprises a gallium nitride (GaN).

23. A Variable Reflectance Distributed Bragg Reflector (VR-DBR) mirror device comprising:
- a transparent substrate;
- a plurality of stacked layers of materials with at least two different refractive indices to form a distributed Bragg reflector (DBR) overlying the transparent substrate:
  - a piezoelectric layer comprising a plurality of voids configured with a single or the plurality of stacked layers such that the piezoelectric layer is configured to the DBR;
  - at least one electrical contact coupled to the piezoelectric layer containing the voids, the electrical contact characterized by a conductive material; and
  - a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;
- wherein the DBR is composed of multi-layer pairs of a dielectric material group or a semiconductor layer group.

24. A Variable Reflectance Distributed Bragg Reflector (VR-DBR) mirror device comprising:
- a transparent substrate;
- a plurality of stacked layers of materials with at least two different refractive indices to form a distributed Bragg reflector (DBR) overlying the transparent substrate:
  - a piezoelectric layer comprising a plurality of voids configured with a single or the plurality of stacked layers such that the piezoelectric layer is configured to the DBR;
  - at least one electrical contact coupled to the piezoelectric layer containing the voids, the electrical contact characterized by a conductive material; and
  - a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;

wherein the voids in a piezoelectric layer are characterized by one or more arbitrary shapes with an inner surface being a combination of more than one crystalline plane.

25. A Variable Reflectance Distributed Bragg Reflector (VR-DBR) mirror device comprising:

a transparent substrate;

a plurality of stacked layers of materials with at least two different refractive indices to form a distributed Bragg reflector (DBR) overlying the transparent substrate:

a piezoelectric layer comprising a plurality of voids configured with a single or the plurality of stacked layers such that the piezoelectric layer is configured to the DBR;

at least one electrical contact coupled to the piezoelectric layer containing the voids, the electrical contact characterized by a conductive material; and a electric energy coupled to the electrical contact and configured to supply an electric field in the piezoelectric layer containing the voids to alter a refractive index of the piezoelectric layer and change a reflection spectrum of the DBR to allow a laser beam to traverse through a portion of the DBR;

wherein the voids of the piezoelectric layer reduce a refractive index of one or more bulk piezoelectric materials such that the electric energy causes a response of the voids to induce a refractive index change between 0.0001 to 0.05.

* * * * *